United States Patent
Endo et al.

(10) Patent No.: US 11,152,616 B2
(45) Date of Patent: Oct. 19, 2021

(54) LITHIUM TRANSITION METAL COMPOSITE OXIDE, TRANSITION METAL HYDROXIDE PRECURSOR, METHOD FOR PRODUCING TRANSITION METAL HYDROXIDE PRECURSOR, METHOD FOR PRODUCING LITHIUM TRANSITION METAL COMPOSITE OXIDE, POSITIVE ACTIVE MATERIAL FOR NONAQUEOUS ELECTROLYTE SECONDARY BATTERY, ELECTRODE FOR NONAQUEOUS ELECTROLYTE SECONDARY BATTERY, NONAQUEOUS ELECTROLYTE SECONDARY BATTERY AND ENERGY STORAGE APPARATUS

(71) Applicant: GS Yuasa International Ltd., Kyoto (JP)

(72) Inventors: Daisuke Endo, Kyoto (JP); Hiromasa Muramatsu, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 342 days.

(21) Appl. No.: 16/317,348

(22) PCT Filed: Jul. 5, 2017

(86) PCT No.: PCT/JP2017/024740
§ 371 (c)(1),
(2) Date: Jan. 11, 2019

(87) PCT Pub. No.: WO2018/012384
PCT Pub. Date: Jan. 18, 2018

(65) Prior Publication Data
US 2019/0341609 A1 Nov. 7, 2019

(30) Foreign Application Priority Data
Jul. 14, 2016 (JP) .............................. JP2016-139727

(51) Int. Cl.
*H01B 1/08* (2006.01)
*H01M 4/50* (2010.01)
(Continued)

(52) U.S. Cl.
CPC ............ *H01M 4/505* (2013.01); *C01G 53/50* (2013.01); *H01B 1/08* (2013.01); *H01M 4/525* (2013.01);
(Continued)

(58) Field of Classification Search
CPC ...... H01B 1/08; C01G 45/1214; C01G 51/42; C01G 53/42; H01M 4/48; H01M 4/50; H01M 4/52; H01M 4/523; H01M 4/525
See application file for complete search history.

(56) References Cited

U.S. PATENT DOCUMENTS 9,525,172 B2 * 12/2016 Endo ................... H01M 10/446
10,673,070 B2 * 6/2020 Endo ..................... H01M 4/525
(Continued)

FOREIGN PATENT DOCUMENTS

| CN | 101215011 A | 7/2008 |
| CN | 103764568 A | 4/2014 |

(Continued)

OTHER PUBLICATIONS

International Search Report dated Sep. 26, 2017 filed in PCT/JP2017/024740.
(Continued)

*Primary Examiner* — Mark Kopec
(74) *Attorney, Agent, or Firm* — Rankin, Hill & Clark LLP (57) ABSTRACT

To provide a hydroxide precursor having a high density, a method for producing a lithium transition metal composite oxide using the precursor, a positive active material having (Continued)

a large discharge capacity per unit volume, which uses the composite oxide, an electrode for nonaqueous electrolyte secondary battery, and a nonaqueous electrolyte secondary battery. A method for producing a transition metal hydroxide precursor for use in production of a lithium transition metal composite oxide, including adding a solution containing a transition metal (Me) into a reaction tank in which a water solvent of dissolution of a complexing agent and a reducing agent has been charged in advance to coprecipitate a transition metal hydroxide that includes Mn and Ni, or Mn, Ni and Co, and has a mole ratio Mn/Me of larger than 0.5 and a mole ratio Co/Me of 0.15 or less. Further, a lithium transition metal composite oxide having an α-NaFeO$_2$-type crystal structure, in which a mole ratio Li/Me is larger than 1, the mole ratios of Mn and Co are as described above, and which has an X-ray diffraction pattern attributable to R3-m, a ratio (FWHM (003)/FWHM (114)) of a full width at half maximum of a diffraction peak of a (003) plane to a full width at half maximum of a diffraction peak of a (104) plane of 0.72 or less, and a peak differential pore volume of 0.50 mm$^3$/(g·nm) or less as determined by a BJH method from an adsorption isotherm using a nitrogen gas adsorption method.

7 Claims, 2 Drawing Sheets (51) Int. Cl.
*C01G 53/00* (2006.01)
*H01M 4/505* (2010.01)
*H01M 4/525* (2010.01)
*H01M 10/0525* (2010.01)
*H01M 4/02* (2006.01)

(52) U.S. Cl.
CPC ..... *H01M 10/0525* (2013.01); *C01P 2002/50* (2013.01); *C01P 2002/74* (2013.01); *C01P 2004/03* (2013.01); *C01P 2006/11* (2013.01); *C01P 2006/14* (2013.01); *C01P 2006/40* (2013.01); *H01M 2004/028* (2013.01)

(56) References Cited

U.S. PATENT DOCUMENTS

| | | |
|---|---|---|
| 2007/0248883 A1 | 10/2007 | Oda et al. |
| 2009/0104530 A1 | 4/2009 | Shizuka et al. |
| 2010/0119945 A1 | 5/2010 | Akagi et al. |
| 2012/0145954 A1 | 6/2012 | Endo |
| 2013/0146808 A1 | 6/2013 | Endo |
| 2013/0260248 A1 | 10/2013 | Seki |
| 2014/0004423 A1 | 1/2014 | Endo |
| 2014/0038053 A1 | 2/2014 | Endo |
| 2014/0205901 A1 | 7/2014 | Nagai |
| 2014/0225031 A1 | 8/2014 | Yasuda |
| 2014/0306151 A1* | 10/2014 | Endo ............... H01M 4/485 252/182.1 |
| 2016/0372749 A1 | 12/2016 | Yasutaka |
| 2018/0145318 A1 | 5/2018 | Endo |

FOREIGN PATENT DOCUMENTS

| | | |
|---|---|---|
| EP | 1391950 A1 | 2/2004 |
| EP | 2677577 A1 | 12/2013 |
| EP | 2816641 A1 | 12/2014 |
| JP | 2007257985 A | 10/2007 |
| JP | 2008282804 A | 11/2008 |
| JP | 2008293988 A | 12/2008 |
| JP | 2008305777 A | 12/2008 |
| JP | 2009117241 A | 5/2009 |
| JP | 2011154997 A | 8/2011 |
| JP | 2013051172 A | 3/2013 |
| JP | 2013206552 A | 10/2013 |
| JP | 2014029828 A | 2/2014 |
| JP | 2014032803 A | 2/2014 |
| JP | 2014044928 A | 3/2014 |
| JP | 2014049239 A | 3/2014 |
| JP | 2014063707 A | 4/2014 |
| JP | 2014089800 A | 5/2014 |
| JP | 2015018678 A | 1/2015 |
| JP | 2015026594 A | 2/2015 |
| JP | 2016017017 A | 2/2016 |
| JP | 2016219278 A | 12/2016 |
| JP | 2014049239 * | 3/2017 |
| WO | 2002086993 A1 | 10/2002 |
| WO | 2011021686 A1 | 2/2011 |
| WO | 2012039413 A1 | 3/2012 |
| WO | 2013047569 A1 | 4/2013 |
| WO | 2016190419 A1 | 12/2016 |

OTHER PUBLICATIONS

Christopher S. Johnson et al: "Synthesis, Characterization and Electrochemistry of Lithium Battery Electrodes : x Li 2 MnO3 (1−x ) LiMn 0.333 Ni 0.333 Co 0.333 O2 (0 <= x ,<= 0.7)", Chemistry of Materials, vol. 20, No. 19, Sep. 2, 2008 (Sep. 2, 2008), pp. 6095-6106; Cited in EESR.

Extended European Search Report (EESR) dated Jan. 7, 2020 issued in the corresponding European patent application No. 17827512.9.

* cited by examiner

LITHIUM TRANSITION METAL COMPOSITE OXIDE, TRANSITION METAL HYDROXIDE PRECURSOR, METHOD FOR PRODUCING TRANSITION METAL HYDROXIDE PRECURSOR, METHOD FOR PRODUCING LITHIUM TRANSITION METAL COMPOSITE OXIDE, POSITIVE ACTIVE MATERIAL FOR NONAQUEOUS ELECTROLYTE SECONDARY BATTERY, ELECTRODE FOR NONAQUEOUS ELECTROLYTE SECONDARY BATTERY, NONAQUEOUS ELECTROLYTE SECONDARY BATTERY AND ENERGY STORAGE APPARATUS

TECHNICAL FIELD

The present invention relates to a lithium transition metal composite oxide, a transition metal hydroxide precursor for use in production of the composite oxide, a method for producing a transition metal hydroxide precursor, a method for producing a lithium transition metal composite oxide using the precursor, a positive active material for a nonaqueous electrolyte secondary battery containing the composite oxide, an electrode for nonaqueous electrolyte secondary battery, a nonaqueous electrolyte secondary battery and an energy storage apparatus.

BACKGROUND ART

Conventionally as a positive active material for a nonaqueous electrolyte secondary battery typified by a lithium secondary battery, a "$LiMeO_2$-type" active material (Me is a transition metal) having an $\alpha$-$NaFeO_2$-type crystal structure has been investigated, and a nonaqueous electrolyte secondary battery using $LiCoO_2$ has been widely put into practical use. However, the discharge capacity of the $LiCoO_2$ has been around 120 to 130 mAh/g. As the transition metal Me, it has been desired to use Mn that is abundant as the earth resource. However, the "$LiMeO_2$-type" active material containing Mn as the Me has had a problem that in a case where the mole ratio Mn/Me of the Mn to the Me exceeds 0.5, a structural change to a spinel type is caused when charging is performed, the crystal structure cannot be maintained, and therefore, the charge-discharge cycle performance becomes remarkably poor.

In view of this, various "$LiMeO_2$-type" active materials that have a mole ratio Mn/Me of Mn to Me of 0.5 or less and are excellent in charge-discharge cycle performance have been proposed, and some of which have been put into practical use. For example, a positive active material containing $LiNi_{1/2}Mn_{1/2}O_2$ or $LiNi_{1/3}Co_{1/3}Mn_{1/3}O_2$, which is a lithium transition metal composite oxide, has a discharge capacity of 150 to 180 mAh/g.

On the other hand, in contrast with a so-called "$LiMeO_2$-type" active material as described above, a so-called "lithium-excess-type" active material in which a lithium transition metal composite oxide having a composition ratio Li/Me of lithium (Li) to a transition metal (Me) of larger than 1, for example, the ratio Li/Me of 1.2 to 1.6, and represented by the composition formula $Li_{1+\alpha}Me_{1-\alpha}O_2$ ($\alpha$>0) is included is also known. It is also known that the above-described lithium transition metal composite oxide is produced from a hydroxide precursor (see, for example, Patent Documents 1 to 4).

In Patent Document 1, descriptions have been shown: "a positive active material for a lithium secondary battery comprising a lithium transition metal composite oxide having an $\alpha$-$NaFeO_2$-type crystal structure and represented by the composition formula of $Li_{1+\alpha}Me_{1-\alpha}O_2$ (Me is a transition metal including Co, Ni and Mn and $\alpha$>0), wherein the positive active material . . . " (claim 1); "the positive active material for the lithium secondary battery according to claim 1, wherein the molar ratio Li/Me of Li to the Me represented by $(1+\alpha)/(1-\alpha)$ is 1.25 to 1.5" (claim 2); and "a method for producing the positive active material for a lithium secondary battery according to claim 1 or 2, wherein a precursor for synthesis of the lithium transition metal composite oxide is a hydroxide of a transition metal including Co, Ni and Mn" (claim 3).

Further, Patent Document 1 describes "pH in the step of producing a precursor by coprecipitating in a solution a compound containing Co, Ni and Mn is not limited, but can be set at 10.5 to 14 when the coprecipitation precursor is prepared as a coprecipitation hydroxide precursor; it is preferable to control pH for increasing the tap density; by setting pH at 11.5 or less, it can be ensured that the tap density is 1.00 g/cm$^3$ or more, so that high-rate discharge performance can be improved; and further, by setting pH at 11.0 or less, the particle growth rate can be accelerated, so that the stirring duration after completion of dropwise addition of a raw material aqueous solution can be reduced" (paragraph [0032]).

Furthermore, descriptions are made in the Examples "cobalt sulfate heptahydrate (14.08 g), nickel sulfate hexahydrate (21.00 g) and manganese sulfate pentahydrate (65.27 g) were weighed, and the total amount of these was dissolved in 200 ml of ion-exchanged water to prepare a 2.0 M aqueous sulfate solution of which the molar ratio of Co:Ni:Mn was 12.50:19.94:67.56; into a 2 L reaction tank was poured 750 ml of ion-exchanged water, and an Ar gas was bubbled for 30 min to thereby remove dissolved oxygen in ion-exchanged water; the temperature of the reaction tank was set at 50° C. (±2° C.), and the aqueous sulfate solution was added dropwise at a rate of 3 ml/min while the contents in the reaction tank were stirred at a rotation speed of 700 rpm using a paddle impeller equipped with a stirring motor; the control was performed so that pH in the reaction tank was kept at 11.0 (±0.05) by appropriately adding dropwise an aqueous solution containing 2.0 M sodium hydroxide and 0.5 M ammonia during dropwise addition; and . . . in this way a coprecipitation hydroxide precursor was prepared" (paragraph [0068]).

Patent Document 2 describes "a method for producing the active material for lithium secondary battery according to claim 1 or 2, comprising: coprecipitating a compound of a transition metal element Me containing Co, Ni and Mn in a solution to produce a coprecipitation precursor of a transition metal carbonate; drying the coprecipitation precursor; and mixing the coprecipitation precursor with a lithium compound so that the molar ratio of the Li to the transition metal element Me in the lithium transition metal composite oxide is $1<(1+\alpha)/(1-\alpha)\le1.5$, and firing the mixture at 700 to 800° C." (claim 3).

Further, Patent Document 2 describes "a pH in the step of coprecipitating a compound containing Co, Ni and Mn in a solution to produce a precursor is not limited, and the pH can be 10 to 14 in a case where the coprecipitation precursor is prepared as a coprecipitation hydroxide precursor, and the pH can be 7.5 to 11 in a case where the coprecipitation precursor is prepared as a coprecipitation carbonate precursor; it is preferable to control the pH in order to increase a tap density; and with regard to the coprecipitation carbonate precursor, by adjusting the pH to 9.4 or less, the tap density of 1.25 g/cm³ or more can be achieved, and thus the high-rate discharge performance can be improved" (paragraph [0035]).

Furthermore, descriptions are made in the Examples "cobalt sulfate heptahydrate (14.08 g), nickel sulfate hexahydrate (21.00 g) and manganese sulfate pentahydrate (65.27 g) were weighed, and the total amount of these was dissolved in 200 ml of ion-exchanged water to prepare a 2.0 M aqueous sulfate solution of which the molar ratio of Co:Ni:Mn was 12.50:19.94:67.56; on the other hand, 750 ml of ion-exchanged water was poured into a 2 L reaction tank, and an Ar gas was bubbled for 30 min to thereby remove dissolved oxygen in ion-exchanged water; the temperature of the reaction tank was set at 50° C. (±2° C.), and the aqueous sulfate solution was added dropwise at a rate of 3 ml/min while the contents in the reaction tank were stirred at a rotation speed of 700 rpm using a paddle impeller equipped with a stirring motor; in this regard, the control was performed so that the pH in the reaction tank was kept at 11.0 (±0.05) by appropriately adding dropwise an aqueous solution containing 1.0 M sodium hydroxide, 1.0 M potassium hydroxide, 0.5 M ammonia and 0.05 M hydrazine aqueous solution during the dropwise addition; and . . . in this way, a coprecipitation hydroxide precursor was prepared" (paragraph [0072]).

Patent Document 3 describes "a mixed active material for a lithium secondary battery, comprising two kinds of lithium transition metal composite oxide particles with different particle sizes in which the transition metal oxide has an α-NaFeO₂ structure, the transition metal (Me) includes Co, Ni and Mn, and the molar ratio Li/Me of lithium (Li) to the transition metal is more than 1, wherein the first lithium transition metal composite oxide particle with a larger particle size has a peak differential pore volume of 0.8 mm³/(g·nm) or more at a pore size in a range of 30 to 40 nm where the differential pore volume determined by a BJH method from an adsorption isotherm using a nitrogen gas adsorption method shows the maximum value, and the second lithium transition metal composite oxide particle with a smaller particle size has a peak differential pore volume of 0.5 mm³/(g·nm) or less at a pore size in a range of 50 to 70 nm where the differential pore volume determined by a BJH method from an adsorption isotherm using a nitrogen gas adsorption method shows the maximum value" (claim 1).

Further, Patent Document 3 describes " . . . in order to increase a tap density, it is preferable to control the pH; and with regard to the coprecipitation carbonate precursor, by adjusting the pH to 9.4 or less, the tap density of 1.25 g/cm³ or more can be achieved, and thus the high-rate discharge performance can be improved" (paragraph [0036]).

Furthermore, descriptions are made in the Examples "[preparation of second lithium transition metal composite oxide particle] cobalt sulfate heptahydrate (14.08 g), nickel sulfate hexahydrate (21.00 g) and manganese sulfate pentahydrate (65.27 g) were weighed, and the total amount of these was dissolved in 200 ml of ion-exchanged water to prepare a 2.0 M aqueous sulfate solution of which the molar ratio of Co:Ni:Mn was 12.5:20.0:67.5; on the other hand, 750 ml of ion-exchanged water was poured into a 2 L reaction tank, and an Ar gas was bubbled for 30 min to thereby remove dissolved oxygen in the ion-exchanged water; the temperature of the reaction tank was set at 50° C. (±2° C.), and the aqueous sulfate solution was added dropwise at a rate of 3 ml/min while the contents in the reaction tank were stirred at a rotation speed of 700 rpm using a paddle impeller equipped with a stirring motor; in this regard, the control was performed so that the pH in the reaction tank was kept at 11.5 (±0.05) by appropriately adding dropwise an aqueous solution containing 2.0 M sodium hydroxide and 1.0 M ammonia during dropwise addition; and . . . in this way, a coprecipitation hydroxide precursor was prepared" (paragraphs [0078] to [0079]). Moreover, a description that by mixing lithium hydroxide monohydrate with the coprecipitation hydroxide precursor, and firing the resultant mixture, a second lithium transition metal composite oxide particle was prepared (see paragraph [0080]) has been shown; and a description that "the second lithium transition metal composite oxide particles of Examples 1 to 16 and Comparative Examples 1, 4 to 6, and 8 had a peak differential pore volume of 0.3 to 0.5 mm³/(g·nm) at a pore size in a range of 50 to 70 nm" (paragraph [0116]) has been shown.

Patent Document 4 describes "a method for producing a lithium-containing compound oxide, comprising mixing a hydroxide that contains Ni and Mn essentially and Co and M optionally, and has a specific surface area of 20 to 50 m²/g with a lithium compound; firing the obtained mixture; and pulverizing the obtained fired material when a lithium-containing composite oxide that is a compound represented by $Li_xNi_aCo_bMn_cM_dO_y$ (wherein x is 1.1 to 1.7, a is 0.15 to 0.5, b is 0 to 0.33, c is 0.33 to 0.85, M is a metal element other than Li, Ni, Co and Mn, d is 0 to 0.05, a+b+c+d=1, and y is the number of moles of oxygen (O) required to satisfy the atomic values of Li, Ni, Co, Mn and M), has a ratio ($I_{020}/I_{003}$) of an integrated intensity ($I_{020}$) of a peak at a (020) plane attributed to a crystal structure of a space group C2/m to an integrated intensity ($I_{003}$) of a peak at a (003) plane attributed to a crystal structure of a space group R-3m of 0.02 to 0.3 in an X ray diffraction pattern, and has a tap density of 1.8 to 2.5 g/cm³ is produced" (claim 1).

Further, Patent Document 4 describes "(case 1) . . . as a complexing agent, an aqueous solution of ammonium sulfate was obtained by dissolving ammonium sulfate in distilled water so as to have a concentration of 1.5 mol/kg" (paragraph [0088]), "distilled water was placed in a 2 L-glass reaction tank with baffle, and the reaction tank was heated to 50° C. with a mantle heater; while the solution in the reaction tank was stirred with paddle-type stirring blades, into the reaction tank, a sulfate aqueous solution at 5.0 g/min and an aqueous ammonium sulfate solution at 0.5 g/min were added for 28 hours, further a pH adjustment solution was added so as to maintain the pH of the mixture to be 10.5, and a hydroxide (coprecipitate) containing Ni and Mn was precipitated; during the addition of the raw material solution, nitrogen gas was flowed into the reaction tank at a flow rate of 1.0 L/min; further, a liquid containing no hydroxide was continuously withdrawn using a filter cloth so that the amount of the liquid in the reaction tank did not exceed 2 L; in order to remove impurity ions from the obtained hydroxide, pressure filtration and dispersion in distilled water were repeated to perform the washing; and the washing was terminated when the filtrate had an electric conductivity of 20 mS/m, and the hydroxide was dried at 120° C. for 15 hours" (paragraph [0089]), and "(case 3) . . . except that an ammonia aqueous solution was used in place of the aqueous ammonium sulfate solution, the hydroxide was obtained in a similar manner as in Example 1" (paragraph [0093]).

Furthermore, descriptions are made in Table 2, as case 3, a hydroxide of Ni: 30.0 mol %, Mn: 70.0 mol %, complexing agent: ammonia, $D_{50}$: 6.7 μm, tap density: 1.41 g/cm³, and specific surface area: 18.0 m²/g (see paragraph [0103]), and descriptions that "case 3 is a case of obtaining a lithium-containing composite oxide having a high tap density without performing the pulverization by increasing the tap density of the hydroxide; and however, since the specific surface area of the lithium-containing composite oxide is small, the discharge capacity of the lithium secondary battery per unit mass of the positive electrode active material is low, and as a result, the discharge capacity of the lithium secondary battery per unit volume of the positive active material is also low" (paragraph [0106]) have been shown.

Moreover, a positive active material for a nonaqueous electrolyte secondary battery, which contains a lithium transition metal composite oxide having specified half widths of the diffraction peaks of a (003) plane and a (104) plane by X-ray diffraction measurement, is known (see, for example, Patent Documents 5 to 8).

Patent Document 5 describes "a lithium rechargeable battery comprising: a current collector; and an active material layer that contains active material particles that are retained on the current collector, wherein the active material particles are secondary particles formed by the aggregation of a plurality of primary particles of a lithium transition metal oxide and have a hollow structure having a hollow section formed within the secondary particle and a shell section that surrounds the hollow section, a through hole that penetrates from the outside to the hollow section is formed in the secondary particle, and the ratio (A/B) in the powder x-ray diffraction pattern of the active material particles, where A is the full width at half maximum of the diffraction peak obtained for the (003) plane and B is the full width at half maximum of the diffraction peak obtained for the (104) plane, satisfies the equation (A/B)≤0.7" (claim 1); and "the lithium rechargeable battery according to claim 1, wherein the lithium transition metal oxide is represented by the following general formula:

$$Li_{1+x}Ni_yCo_zMn_{(1-y-z)}W_\alpha M_\beta O_2$$

wherein in formula (1), x, y, z, α, and β are real numbers that satisfy all of the following: 0≤x≤0.2, 0.1<y<0.9, 0.1<z<0.4, 0.0005≤α≤0.01, and 0≤β≤0.01, and M is either not present or is one or two or more elements selected from the group consisting of Zr, Mg, Ca, Na, Fe, Cr, Zn, Si, Sn, Al, B, and F" (claim 6).

Further, descriptions are made in paragraphs [0073] to [0082], by mixing complex hydroxide particles obtained by adjusting the amount of W addition to be 0.5% by mole relative to 100% by mole of the raw material having a mole ratio Ni:Co:Mn of 0.33:0.33:0.33 with lithium carbonate so that the ratio Li/Me is around 1.15, and by firing the resultant mixture, an active material particle having a hollow structure or a solid structure and including a lithium transition metal composite oxide was produced.

Patent Document 6 describes "an active material comprising a layered structure and a composition represented by the formula (1) below, the active material having: a ratio of a half width $FWHM_{003}$ of a diffraction peak at a (003)-plane to a half width $FWHM_{104}$ of a diffraction peak at a (104)-plane represented by the formula (2) below, where both the peaks are obtained by X-ray powder diffraction; and an average primary particle diameter of 0.2 μm to 0.5 μm, (1)

[wherein the element M is at least one element selected from the group consisting of Al, Si, Zr, Ti, Fe, Mg, Nb, Ba and V, and a, b, c, d, x and y satisfy the following formulae: 1.9≤(a+b+c+d+y)≤2.1, 1.0<y≤1.3, 0<a≤0.3, 0<b≤0.25, 0.3≤c≤0.7, 0≤d≤0.1, and 1.9≤x≤2.1.]

(2)" (claim 1).

Further, descriptions are made in Examples, into the solution of the raw-material mixture containing lithium acetate dihydrate, cobalt acetate tetrahydrate, manganese acetate tetrahydrate, and nickel acetate tetrahydrate, citric acid was added, reaction of the resultant mixture proceeded to obtain a precursor, and then the precursor was fired to obtain a lithium compound (active material) such as $Li_{1.2}Ni_{0.17}Co_{0.07}Mn_{0.56}O_2$ (see paragraphs [0050], [0051], and [0062]).

Patent Document 7 describes "an active material for a lithium secondary battery, comprising a solid solution of a sodium-containing lithium transition metal composite oxide having an α-NaFeO$_2$ crystal structure, wherein the chemical composition formula of the solid solution satisfies $Li_{1+x-y}Na_yCo_aNi_bMn_cO_{2+d}$ (0<y≤0.1, 0.4≤c≤0.7, x+a+b+c=1, 0.1≤x≤0.25, −0.2≤d≤0.2), the active material has an X-ray diffraction pattern attributable to a hexagonal crystal (space group P3$_1$12), and in the Miller index hkl, the half width of the diffraction peak of the (003) plane is 0.30° or less and the half width of the diffraction peak of the (114) plane is 0.50° or less." (claim 1).

Further, descriptions are made in paragraph [0052] "one more indicator that shows the degree of crystallization is a half width of an X-ray diffraction peak as described previously; in the present invention, for improving the low-temperature characteristic, it is necessary that the half width of the diffraction peak of the (003) plane be 0.30° or less and the half width of the diffraction peak of the (114) plane be 0.50° or less in an X-ray diffraction pattern attributed to a space group P3$_1$12; and the half width of the diffraction peak of the (003) plane is preferably 0.17° to 0.30°, and the half width of the diffraction peak of the (114) plane is preferably 0.35° to 0.50°".

Furthermore, descriptions are made in Examples 1 to 31, when a coprecipitation hydroxide precursor of a transition metal, lithium hydroxide monohydrate, and sodium carbonate were mixed so as to be various compositions, and the active material fired at 1000° C. was subjected to crystal structure analysis, the half width of the diffraction peak of the (003) plane was "0.19 to 0.21°", and the half width of the diffraction peak of the (114) plane was "0.39 to 0.41°" (see, paragraphs [0074] to [0078], [0102], and Table 1).

Patent Document 8 describes "a positive active material for a lithium secondary battery containing a lithium-transition metal composite oxide represented by a composition formula of $Li_{1+\alpha}Me_{1-\alpha}O_2$ (Me is a transition metal element including Co, Ni, and Mn; 1.2<(1+α)/(1−α)<1.6), wherein a molar ratio (Co/Me) of Co contained in the Me ranges from 0.24 to 0.36, and when a space group R3-m is used for a crystal structure model based on an X-ray diffraction pattern, a half width of a diffraction peak that attributes to a (003) plane ranges from 0.204° to 0.303°, or a half width of a diffraction peak that attributes to a (104) plane ranges from 0.278° to 0.424°" (claim 1).

Further, descriptions are made in paragraph [0025] "the peak differential pore volume is preferably 0.85 mm$^3$/(g·nm) or more; and by setting the peak differential pore volume to be equal to or more than 0.85 mm$^3$/(g·nm), a lithium secondary battery having an excellent initial efficiency can be obtained".

Furthermore, descriptions are made in Examples 3 to 6, lithium transition metal composite oxides that are each prepared from a carbonate precursor, and have a Li/Me ratio of 1.3, a Mn/Me ratio of 0.52 to 0.44, and a Co/Me ratio of 0.28 to 0.36 (see paragraphs [0066] to [0068], [0096], and Table 1).

PRIOR ART DOCUMENTS

Patent Documents

Patent Document 1: JP-A-2014-29828
Patent Document 2: JP-A-2014-63707
Patent Document 3: JP-A-2015-26594
Patent Document 4: JP-A-2016-17017
Patent Document 5: JP-A-2013-51172
Patent Document 6: JP-A-2013-206552
Patent Document 7: WO 2012/039413
Patent Document 8: JP-A-2014-44928

DISCLOSURE OF THE INVENTION

Problems to be Solved by the Invention

The discharge capacity of the above-described so-called "lithium-excess-type" active material is generally larger than the discharge capacity of a so-called "LiMeO$_2$-type" active material as described in Patent Documents 1 to 8.

Further, as described above, as the precursor of a "lithium-excess-type" positive active material, a hydroxide precursor and a carbonate precursor are known.

When a carbonate precursor is used, the high-rate discharge performance can be increased while maintaining the high energy density (per unit mass), however, there is a problem that since the powder density is low, the electrode filling property is poor, and thus it is difficult to contribute to the improvement of energy density per unit volume.

In view of this, the present invention is intended to solve the above problem by using a hydroxide precursor as the precursor of a "lithium-excess-type" positive active material.

However, the densification of a hydroxide precursor is extremely difficult due to the high Mn/Me ratio. This is related to a feature in which the crystalline form of primary particles of Ni(OH)$_2$ or Co(OH)$_2$ is granular, whereas the crystalline form of primary particles of Mn(OH)$_2$ is flaky. In addition, it is difficult to further densify the hydroxide precursor at a composition with a low Co/Me ratio (Co/Me<0.15).

Conventionally, as described in Patent Documents 1 to 4, in the production method of a hydroxide precursor, an alkaline solution containing ammonia, or ammonia and hydrazine has been added dropwise at the same time as the dropwise addition of an aqueous solution of a transition metal compound without containing a complexing agent such as ammonia and a reducing agent such as hydrazine in a reaction tank before dropwise addition of the aqueous solution of a transition metal compound.

Figure 2:
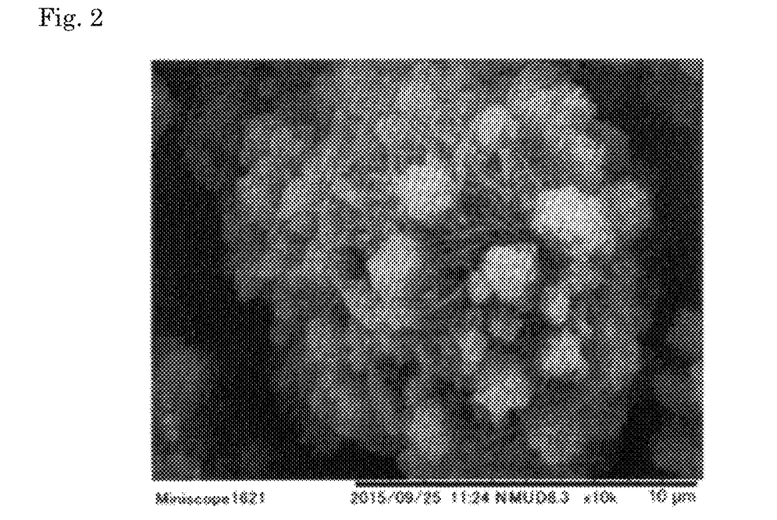
FIG. 2 is a SEM photograph of a conventional hydroxide precursor.

However, the hydroxide precursor produced by a conventional method at a composition with a low Co/Me ratio has a crystalline form that does not become particulates having a high density, and becomes a porous form as shown in a scanning electron microscope (SEM) photograph of FIG. 2. Therefore, the density of the hydroxide precursor is low, the densification of the active material is difficult, and eventually it has been difficult to improve the energy density per unit volume.

As described in Patent Documents 2 and 3, with respect to the carbonate precursor, it is known that the tap density can be made to be 1.25 g/cm$^3$ or more by a method in which the pH at the time of coprecipitation from an aqueous solution of a transition metal compound is 9.4 or less, however, with respect to the hydroxide precursor, it is not known to produce a precursor with a high density by adopting a method as described above.

In Patent Document 4, a description that the tap density of a hydroxide precursor is increased, and a lithium containing composite oxide having a high tap density is obtained has been shown, however, a description of obtaining a lithium secondary battery that has a high discharge capacity per unit volume of a positive active material by using this hydroxide precursor has not been shown.

In the invention described in Patent Document 5, in order to improve the output power in a low SOC range, the positive active material has a hollow structure, and therefore rather the capacity per unit volume is decreased, and the invention cannot be a motivation to improve the capacity per unit volume.

In the invention described in Patent Document 6, since a precursor is prepared by a sol-gel method by adding citric acid to an acetate aqueous solution, and then the firing is performed, it is difficult to obtain an active material having a high density.

In the invention described in Patent Document 7, in order to improve the low-temperature characteristic, sodium is contained in a lithium transition metal composite oxide, and it is not intended to improve the capacity per unit volume.

In the invention described in Patent Document 8, a lithium transition metal composite oxide prepared from a carbonate precursor is used as an active material, and the peak differential pore volume is 0.85 mm$^3$/(g·nm) or more, and therefore the active material is a porous active material, and the invention is not intended to improve the capacity per unit volume.

An object of the present invention is to produce a hydroxide precursor having a high density, to produce a lithium transition metal composite oxide by using the precursor, and to provide a positive active material having a large discharge capacity per unit volume by using the lithium transition metal composite oxide, an electrode for nonaqueous electrolyte secondary battery, and a nonaqueous electrolyte secondary battery.

Means for Solving the Problems

In order to solve the problem described above, one aspect of the present invention adopts "a lithium transition metal composite oxide, including an α-NaFeO$_2$-type crystal structure, in which a mole ratio (Li/Me) of Li to a transition metal (Me) is larger than 1, the Li and the transition metal (Me) form the lithium transition metal composite oxide, the transition metal (Me) includes Mn and Ni, or Mn, Ni and Co, a mole ratio Mn/Me of the Mn to the transition metal (Me) is larger than 0.5, and a mole ratio Co/Me of the Co to the transition metal (Me) is 0.15 or less, the lithium transition metal composite oxide has an X-ray diffraction pattern attributable to R3-m, and a ratio (FWHM (003)/FWHM (104)) of a full width at half maximum of a diffraction peak of a (003) plane to a full width at half maximum of a diffraction peak of a (104) plane in a Miller index hkl in X-ray diffraction measurement using a CuKα ray is 0.72 or less, or the lithium transition metal composite oxide has an X-ray diffraction pattern attributable to P3$_1$12, and a ratio (FWHM (003)/FWHM (114)) of a full width at half maximum of a diffraction peak of a (003) plane to a full width at half maximum of a diffraction peak of a (114) plane in a Miller index hkl in X-ray diffraction measurement using a CuKα ray is 0.72 or less, and particles of the lithium transition metal composite oxide have a peak differential pore volume of 0.50 mm$^3$/(g·nm) or less as determined by a BJH method from an adsorption isotherm using a nitrogen gas adsorption method".

Another one aspect of the present invention is "a transition metal hydroxide precursor for use in production of the lithium transition metal composite oxide, in which a transition metal (Me) includes Mn and Ni, or Mn, Ni and Co in the transition metal hydroxide precursor, a mole ratio Mn/Me of the Mn to the transition metal (Me) is larger than 0.5, and a mole ratio Co/Me of the Co to the transition metal (Me) is 0.15 or less, and a tap density is 1.2 or more".

Another one aspect of the present invention is "a method for producing a transition metal hydroxide precursor for use in production of a lithium transition metal composite oxide, including adding a solution containing a transition metal (Me) into a reaction tank in which a water solvent of dissolution of a complexing agent and a reducing agent has been charged in advance to coprecipitate a transition metal hydroxide, in which the transition metal (Me) includes Mn and Ni, or Mn, Ni and Co in the transition metal hydroxide precursor, a mole ratio Mn/Me of the Mn to the transition metal (Me) is larger than 0.5, and a mole ratio Co/Me of the Co to the transition metal (Me) is 0.15 or less".

Another one aspect of the present invention is "a method for producing a lithium transition metal composite oxide, in which a transition metal hydroxide precursor produced by the method for producing a transition metal hydroxide precursor and a lithium compound are mixed, and the resultant mixture is fired, including mixing the transition metal hydroxide precursor and the lithium compound, and firing the resultant mixture at 800 to 940° C. to produce a lithium transition metal composite oxide that has an α-NaFeO$_2$-type crystal structure, in which a mole ratio (Li/Me) of the Li to the transition metal (Me) is larger than 1, the Li and the transition metal (Me) form the lithium transition metal composite oxide, and the transition metal (Me) includes Mn and Ni, or Mn, Ni and Co, a mole ratio Mn/Me of the Mn to the transition metal (Me) is larger than 0.5, and a mole ratio Co/Me of the Co to the transition metal (Me) is 0.15 or less".

Another one aspect of the present invention is a positive active material for a nonaqueous electrolyte secondary battery, including the lithium transition metal composite oxide; an electrode for nonaqueous electrolyte secondary battery, including the positive active material; and a nonaqueous electrolyte secondary battery, including the electrode.

Advantages of the Invention

According to the present invention, a hydroxide precursor having a high density, and a lithium transition metal composite oxide using the hydroxide precursor can be provided, further, a positive active material having a large discharge capacity per unit volume (energy density), an electrode for nonaqueous electrolyte secondary battery containing the positive active material, and a nonaqueous electrolyte secondary battery provided with the electrode can be provided.

MODE FOR CARRYING OUT THE INVENTION

[Method for Producing Hydroxide Precursor]
The present inventors, et al. have found that when a transition metal hydroxide precursor for use in production of a lithium transition metal composite oxide is produced, densification of the hydroxide precursor particles can be achieved by dissolving a complexing agent and a reducing agent in a reaction tank in advance before dropwise addition of an aqueous solution of a transition metal compound.

One embodiment of the present invention (hereinafter, referred to as "the present embodiment") based on the above-described findings is a method for producing a transition metal hydroxide precursor for use in production of a lithium transition metal composite oxide, including adding a solution containing a transition metal (Me) into a reaction tank in which a water solvent of dissolution of a complexing agent and a reducing agent has been charged in advance to coprecipitate a transition metal hydroxide, in which the transition metal (Me) includes Mn and Ni, or Mn, Ni and Co in the transition metal hydroxide precursor, a mole ratio Mn/Me of the Mn to the transition metal (Me) is larger than 0.5, and a mole ratio Co/Me of the Co to the transition metal (Me) is 0.15 or less.

Figure 1:
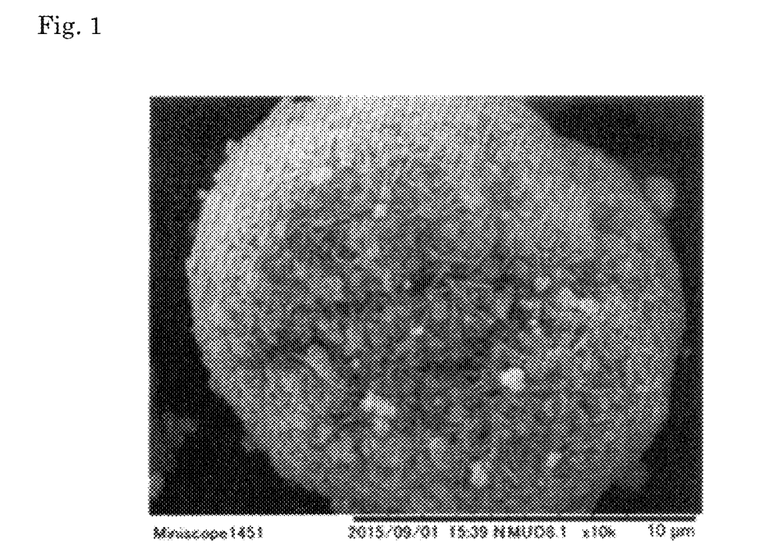
FIG. 1 is a SEM photograph of a hydroxide precursor of Example 2.

As shown in a SEM photograph of FIG. 1, the hydroxide precursor produced by this method has a crystalline form of particulates having a high density, and a tap density is 1.2 g/cm$^3$ or more.

(Measurement of Tap Density of Precursor)
In the present specification, the tap density of each of a hydroxide precursor and a carbonate precursor is measured by the following method. Into a 10$^{-2}$-dm$^3$ graduated cylinder, 2 g±0.2 g of powder of a sample to be measured is charged, the volume of the sample is obtained after counted 300 times by using a tapping apparatus manufactured by REI ELECTRIC CO., LTD., and a value obtained by dividing the volume by the mass of the charged sample is adopted.

The lithium transition metal composite oxide to be produced by using the transition metal hydroxide precursor according to the present embodiment is a "lithium-excess-type" active material, and therefore the mole ratio Mn/Me of the Mn to the transition metal (Me) is larger than 0.5 in the hydroxide precursor. When the mole ratio is in this range, the tap density of the hydroxide precursor can be improved.

In addition, in a case of employing the above-described method in which a complexing agent and a reducing agent are dissolved in advance in a reaction tank, when the mole ratio Co/Me of the Co exceeds 0.15, the tap density of the hydroxide precursor becomes lowered as in Comparative Example described later, and therefore in order to obtain the tap density of the hydroxide precursor of 1.2 g/cm$^3$ or more, the ratio Co/Me is set to be 0.15 or less.

The mole ratio Ni/Me of the Ni to the transition metal element Me is preferably 0.3 to 0.5. When the mole ratio is in this range, the tap density of the hydroxide precursor can be improved.

As the complexing agent, ammonia, ammonium sulfate, ammonium nitrate, or the like can be used, and ammonia is preferably used. Due to the crystallization reaction using a complexing agent, a precursor having a larger tap density can be prepared. It is preferred to use a reducing agent together with the complexing agent. As the reducing agent, hydrazine, sodium borohydride, or the like can be used, and hydrazine is preferably used.

The concentration of the complexing agent that is dissolved in advance in a reaction tank is preferably 0.2 to 1.25 M. By setting the concentration of the complexing agent to be 1.25 M or less, the generation of the precursor is promoted due to the crystallization reaction, and therefore this is preferred.

The concentration of the reducing agent is preferably 0.05 to 0.5 M. By setting the concentration of the reducing agent to be 0.5 M or less, the possibility that a zero-valent transition metal is mixed into the precursor to be generated can be reduced, and therefore this is preferred.

In preparing the hydroxide precursor, Mn among Ni, Co and Mn is easily oxidized, a coprecipitation precursor in which Ni and Mn, or Ni, Co and Mn are uniformly distributed in a divalent state is not easily prepared, and therefore the uniform mixing at the atomic level of Ni and Mn, or Ni, Co and Mn tends to be insufficient. In particular, in the composition range of the present embodiment, the Mn ratio is higher than the Ni and Co ratios, and therefore it is particularly important to remove dissolved oxygen in an aqueous solution. As the method for removing the dissolved oxygen, a method of bubbling a gas containing no oxygen can be mentioned. As the gas containing no oxygen, it is not limited, and nitrogen gas, argon gas, carbon dioxide ($CO_2$), or the like can be used.

The pH in the step of coprecipitating a compound containing Ni and Mn, or Ni, Co, and Mn in a solution to produce a hydroxide precursor is not limited, and can be set to 8 to 14. It is preferable to control the pH in order to increase the tap density. The pH is preferably 9 to 10, and is more preferably smaller than 10. By coprecipitating at a low pH, the tap density can be set to 1.2 $g/cm^3$ or more. Further, the particle growth rate can be accelerated, so that the stirring duration after completion of dropwise addition of a raw material aqueous solution can be reduced.

Examples of the raw material of the hydroxide precursor include manganese oxide, manganese carbonate, manganese sulfate, manganese nitrate, manganese acetate, or the like as a Mn compound; nickel hydroxide, nickel carbonate, nickel sulfate, nickel nitrate, nickel acetate, or the like as a Ni compound; and cobalt sulfate, cobalt nitrate, cobalt acetate, or the like as a Co compound.

In the present embodiment, a reaction crystallization method in which an aqueous solution containing a transition metal (raw material aqueous solution of a hydroxide precursor) is supplied by dropwise addition into a reaction tank inside of which is kept alkaline to obtain a hydroxide precursor is employed. In this regard, as the neutralizing agent, an alkali metal hydroxide such as sodium hydroxide, and lithium hydroxide can be used.

A method in which during the supply of a raw material aqueous solution of a hydroxide precursor by dropwise addition, a mixed alkaline solution containing an alkali metal hydroxide (neutralizing agent) such as sodium hydroxide, a complexing agent such as ammonia, and a reducing agent such as hydrazine is appropriately added dropwise is preferred. The concentration of the alkali metal hydroxide to be added dropwise is preferably 1.0 to 8.0 M. The concentration of the complexing agent is preferably 0.05 to 2.0 M, and the concentration of the reducing agent is preferably 0.02 to 1.0 M.

The rate of dropwise addition of the raw material aqueous solution greatly affects the uniformity of the element distribution within one particle of the hydroxide precursor to be generated. In particular, Mn hardly forms a uniform element distribution with Co and Ni, and therefore requires care. The preferred rate of dropwise addition is preferably 30 mL/min or less although the rate is affected by the size of the reaction tank, the stirring conditions, the pH, the reaction temperature, or the like. In order to improve the discharge capacity, the rate of dropwise addition is more preferably 10 mL/min or less, and most preferably 5 mL/min or less.

In addition, in a case where a complexing agent such as ammonia is present in a reaction tank, and certain convection conditions are applied, rotation of particles and revolution of particles in a stirring tank are promoted by further continuing the stirring after completion of the dropwise addition of the raw material aqueous solution, and in this process, while colliding with one another, the particles each are grown stepwise into a concentric circular sphere. That is, the hydroxide precursor is formed through reactions in two stages, that is, a metal complex formation reaction when the raw material aqueous solution is added dropwise into a reaction tank and a precipitate formation reaction that occurs during retention of the metal complex in the reaction tank. Therefore, by appropriately selecting a time during which the stirring is further continued after completion of the dropwise addition of the raw material aqueous solution, a hydroxide precursor having a desired particle size can be obtained.

The preferred duration time of the stirring after completion of the dropwise addition of the raw material aqueous solution is preferably 0.5 hour or more, and more preferably 1 hour or more in order to grow the particles as uniform spherical particles although the duration time is affected by the size of the reaction tank, the stirring conditions, the pH, the reaction temperature, or the like. Further, in order to decrease the possibility that the output power performance in a low SOC range of the battery becomes insufficient due to the excessively large particle size, the duration time is preferably 15 hours or less, more preferably 10 hours or less, and most preferably 5 hours or less.

In addition, the preferred duration time of the stirring in order to set the D50 that is a particle size with which the cumulative volume in the particle size distribution of secondary particles of the hydroxide precursor and the lithium transition metal composite oxide is 50% to 13 μm or less varies depending on the pH to be controlled. For example, in a case where the pH is controlled to 8 to 14, the duration time of the stirring is preferably 0.5 to 5 hours, and in a case where the pH is controlled to 9 to 10, the duration time of the stirring is preferably 1 to 3 hours.

In a case where particles of the hydroxide precursor are prepared by using a sodium compound such as sodium hydroxide as a neutralizing agent, sodium ions deposited on the particles are washed off in the subsequent washing step. For example, when the prepared hydroxide precursor is extracted by suction filtration, such a condition that the number of times of washing with 100 ml of ion-exchange water is 5 or more can be employed.

[Method for Producing Lithium Transition Metal Composite Oxide]

The lithium transition metal composite oxide of the present embodiment can be suitably produced by a method in which the hydroxide precursor and a lithium compound (Li compound) are mixed, and then the resultant mixture is fired.

The lithium transition metal composite oxide produced by this method has an α-$NaFeO_2$-type crystal structure, in which a mole ratio (Li/Me) of the Li to the transition metal (Me) is larger than 1, the Li and the transition metal (Me)

form the lithium transition metal composite oxide, the transition metal (Me) includes Mn and Ni, or Mn, Ni and Co, a mole ratio Mn/Me of the Mn to the transition metal (Me) is larger than 0.5, and a mole ratio Co/Me of the Co to the transition metal (Me) is 0.15 or less.

As the Li compound, lithium hydroxide, lithium carbonate, lithium nitrate, lithium acetate or the like can be used. In this regard, with respect to the amount of the Li compound, the Li compound is preferably charged in an amount excessive by around 1 to 5% in consideration of the disappearance of a part of the Li compound during firing.

The most suitable mixing ratio of the hydroxide precursor and the lithium compound also relates to the value of the pH controlled when the hydroxide precursor is produced in a solution. In the production method according to the present invention, as described above, the value of the pH to be controlled is preferably 14 or less, more preferably 10 or less, and furthermore preferably smaller than 10, and in a case where the pH to be controlled in this way is set to a relatively small value, the ratio Li/Me is a relatively small value, and thus a positive active material capable of forming a nonaqueous electrolyte battery that is excellent in the high-rate discharge performance can be obtained, and therefore this is preferred. Specifically, the value of the ratio Li/Me is preferably less than 1.4, more preferably 1.3 or less, and furthermore preferably 1.2 or less.

The firing temperature affects the reversible capacity of an active material.

If the firing temperature is extremely high, the obtained active material disintegrates with the oxygen release reaction, and further there is a tendency that in addition to the main phase hexagonal crystal, the phase defined by the monoclinic $Li[Li_{1/3}Mn_{2/3}]O_2$ type is observed as a separated phase rather than a solid solution phase. If such a separated phase is included in an excessively large amount, decrease of the reversible capacity of the active material is caused, and therefore this is not preferred. In such a material, impurity peaks are observed in the vicinity of 35° and the vicinity of 45° on the X-ray diffraction pattern. Therefore, the firing temperature is preferably lower than the temperature at which the oxygen release reaction of the active material has an influence. The oxygen release temperature of the active material is roughly 1000° C. or more in the composition range according to the present embodiment, but there is a slight difference in the oxygen release temperature depending on the composition of the active material, and therefore it is preferable to confirm the oxygen release temperature of the active material in advance. In particular, since it is confirmed that as the amount of the Co contained in a sample is larger, the oxygen release temperature of the hydroxide precursor shifts to the lower temperature, care is required. As the method for confirming the oxygen release temperature of the active material, a mixture of a hydroxide precursor and a lithium compound may be subjected to thermogravimetric analysis (DTA-TG measurement) for simulating the firing reaction process. However, in this method, platinum used in a sample chamber of a measuring apparatus may be corroded by a volatilized Li component and may damage the apparatus, and therefore it is favorable that a composition crystallized to some degree by adopting a firing temperature of around 500° C. in advance is subjected to the thermogravimetric analysis.

On the other hand, when the firing temperature is excessively low, the crystallization does not sufficiently proceed, and thus the electrode characteristics tend to be lowered. In the present embodiment, the firing temperature is preferably higher than 700° C. By allowing the crystallization to proceed sufficiently, the resistance of the crystal grain boundary is reduced, and the smooth transportation of lithium ions can be facilitated.

In addition, the inventors, et al. have analyzed in detail the full width at half maximum of the diffraction peak of the active material according to the present embodiment, and as a result, have found that in a sample synthesized at a temperature of less than 750° C., strain remains in a lattice, and when the sample is synthesized at a temperature of 750° C. or more, the strain can be almost eliminated. Further, it has been found that the size of the crystallite increases in proportion to the increase in the synthesis temperature. Accordingly, it has been found that in the composition of the active material according to the present embodiment, a particle having almost no strain of a lattice in the system and having a crystallite size grown sufficiently can be achieved, and thus a favorable discharge capacity can be obtained. Specifically, it is preferable to employ the synthesis temperature (firing temperature) and the Li/Me ratio composition, with which the amount of the strain affecting the lattice constant is 2% or less and the crystallite size grows to 50 nm or more. It has been found that when charge-discharge is performed with an electrode using the active material, although there is a change due to expansion and shrinkage, the crystallite size is kept 30 nm or more even in the charge-discharge process. That is, by selecting the firing temperature as close as possible to the oxygen release temperature of the above-described active material, for the first time, an active material having a remarkably large reversible capacity can be obtained.

As described above, the preferred firing temperature varies depending on the oxygen release temperature of the active material, and therefore it is difficult to sweepingly set the preferred range of the firing temperature. However, in order to make the discharge capacity per unit volume sufficient in a case where the mole ratio Li/Me is 1.1 to 1.3, the firing temperature is set to preferably 800 to 940° C., and more preferably 800 to 900° C.

[Positive Active Material and Lithium Transition Metal Composite Oxide]

The lithium transition metal composite oxide is a lithium transition metal composite oxide produced by the method as described above according to the present embodiment, and the positive active material for a nonaqueous electrolyte secondary battery is a positive active material containing the above-described lithium transition metal composite oxide.

From the viewpoint of obtaining a high discharge capacity, the composition of the lithium transition metal composite oxide according to the present embodiment contains a transition metal element Me including Mn and Ni, or Mn, Ni and Co, and Li, and is a so-called "lithium-excess-type" that can be expressed as $Li_{1+\alpha}Me_{1-\alpha}O_2$ ($\alpha>0$).

In the present embodiment, in the composition formula $Li_{1+\alpha}Me_{1-\alpha}O_2$ ($\alpha>0$), the mole ratio Li/Me of the Li to the transition metal element Me, which is expressed by $(1+\alpha)/(1-\alpha)$, is preferably 1.1 or more and less than 1.4, more preferably 1.1 or more and 1.3 or less, and particularly preferably 1.1 or more and 1.2 or less. When the mole ratio is in this range, the discharge capacity per unit volume is improved.

The mole ratio Mn/Me of the Mn to the transition metal (Me) is larger than 0.5. The mole ratio Mn/Me is preferably 0.51 or more and less than 0.7, and more preferably 0.51 to 0.59. When the mole ratio is in this range, the tap density of the hydroxide precursor can be improved, and the discharge capacity per unit volume is improved.

Although Co has an effect of improving the initial efficiency when the amount of Co is extremely large, the tap density of the hydroxide precursor becomes lower, the peak differential pore volume becomes larger, and the discharge capacity per unit volume becomes smaller, as in Comparative Example described later. Further, since the Co is a rare resource, the cost becomes high. Therefore, the mole ratio Co/Me of the Co to the transition metal element Me is set to 0.15 or less. The mole ratio Co/Me is preferably less than 0.1, and may be 0. When the mole ratio Co/Me is in this range, the discharge capacity per unit volume is improved.

The mole ratio Ni/Me of the Ni to the transition metal element Me is preferably 0.3 to 0.5, and more preferably 0.35 to 0.45. When the mole ratio Ni/Me is in this range, the tap density of the hydroxide precursor can be improved, and the discharge capacity per unit volume is improved.

With such a composition, a nonaqueous electrolyte secondary battery having a large discharge capacity per unit volume can be obtained.

The lithium transition metal composite oxide according to the present embodiment has an $\alpha$-NaFeO$_2$ structure. The lithium transition metal composite oxide after synthesis (before performing charge-discharge) is attributed to a space group P3$_1$12 or R3-m. Among them, in those attributed to the space group P3$_1$12, a superlattice peak (peak observed in a (Li[Li$_{1/3}$Mn$_{2/3}$]O$_2$-type monoclinic crystal) is confirmed in the vicinity of 2θ=21° on an X-ray diffraction pattern using a CuKα bulb. However, when the charging is performed even once, the Li in the crystal is deintercalated, and the symmetry of the crystal is changed, as a result of which the superlattice peak disappears, and the lithium transition metal composite oxide becomes attributed to the space group R3-m. In this regard, P3$_1$12 is a crystal structure model in which atom positions at 3a, 3b and 6c sites in R3-m are subdivided, and the P3$_1$12 model is employed when the orderliness is observed in the atomic arrangement in R3-m. Note that the "R3-m" is originally expressed with a bar "-" added above the "3" of the "R3m".

In the lithium transition metal composite oxide according to the present embodiment, when the space group R3-m is used as a crystal structure model on the basis of an X-ray diffraction pattern, the ratio of the full width at half maximum of the diffraction peak attributed to the (003) plane to the full width at half maximum of the diffraction peak attributed to the (104) plane, that is, the value of the ratio FWHM (003)/FWHM (104) is 0.72 or less. By having such a crystal structure, the discharge capacity per unit volume can be increased.

Note that the diffraction peak at 2θ=18.6°±1° is indexed to the (003) plane in the Miller index hkl for the space groups P3$_1$12 and R3-m, and the diffraction peak at 2θ=44.1°±1° is indexed to the (114) plane for the space group P3$_1$12, and to the (104) plane for the space group R3-m.

The FWHM (104) is an index of crystallinity in all directions. When the FWHM (104) is excessively small, the crystallization excessively proceeds, the crystallite is increased, and Li ions are not sufficiently diffused. When the FWHM (104) is excessively large, the crystallinity is low, and the transportation efficiency of Li ions is lowered. Therefore, the FWHM (104) is preferably in the range of 0.21° or more and 0.55° or less.

The FWHM ratio is an index of the crystallinity along the c-axis direction with respect to the crystallinity in all directions in the crystal structure. When the ratio FWHM (003)/FWHM (104) is excessively large, the degree of the crystal growth in the c-axis direction is decreased, and Li ions cannot be smoothly inserted into and removed from between layers. Therefore, the value of the ratio FWHM (003)/FWHM (104) is 0.72 or less. Further, when the value of the ratio FWHM (003)/FWHM (104) is not excessively small, elution of Mn due to the increase in the contact area between the crystal grain boundary and the electrolyte solution can be suppressed. Therefore, the value of the ratio FWHM (003)/FWHM (104) is preferably 0.56 or more.

(Measurement of Full Width at Half Maximum)

The full width at half maximum of the lithium transition metal composite oxide is measured by using an X-ray diffractometer (model name: MiniFlex II, manufactured by Rigaku Corporation). Specifically, the measurement is performed in accordance with the following conditions and procedures.

The ray source is CuKα, and the acceleration voltage and current are set to 30 kV and 15 mA, respectively. The sampling width is set to 0.01 deg, the scanning time is set to 14 minutes (scanning speed is 5.0), the divergence slit width is set to 0.625 deg, the light-receiving slit width is set to open, and the scattering slit is set to 8.0 mm. With respect to the obtained X-ray diffraction data, the peak derived from K$_{\alpha 2}$ is not removed, and by using "PDXL" that is supplied software of the X-ray diffractometer, in the space group R3-m, the full width at half maximum FWHM (003) for the X-ray diffraction peak that is indexed to the (003) plane and is present at 2θ=18.6°±1° on the X-ray diffraction pattern, and the full width at half maximum FWHM (104) for the X-ray diffraction peak that is indexed to the (104) plane and is present at 2θ=44±1° on the X-ray diffraction pattern are determined.

The active material according to the present embodiment has a peak differential pore volume of 0.50 mm$^3$/(g·nm) or less as determined by a BJH method from an adsorption isotherm using a nitrogen gas adsorption method. Such an active material having a high density can be obtained by firing a transition metal hydroxide precursor and a lithium compound. The peak differential pore volume is preferably 0.42 mm$^3$/(g·nm) or less.

(Measurement of Peak Differential Pore Volume)

In the present specification, the peak differential pore volume of a lithium transition metal composite oxide particle is measured by the following method. Into a sample tube for measurement, 1.00 g of powder of a sample to be measured is charged, and vacuum-dried at 120° C. for 12 hours to sufficiently remove the moisture in the measurement sample. Next, by a nitrogen gas adsorption method using liquid nitrogen, isotherms on the adsorption side and the desorption side are measured at a relative pressure P/P0 (P0=around 770 mmHg) within the range of from 0 to 1. In addition, the pore distribution is evaluated with the calculation by a BJH method using the isotherm on the desorption side, and the peak differential pore volume is determined.

A sample to be used for the various measurements described above is used as it is as long as the sample is powder of an active material before preparation of an electrode. In a case where a battery is disassembled, an electrode is taken out from the battery, and a sample is collected from the electrode, the battery is discharged by the following procedures before being disassembled. First, constant current charge is performed with a current of 0.1 C up to the battery voltage at which the potential of the positive electrode is 4.3 V (vs. Li/Li$^+$), and then constant voltage charge is performed at the identical battery voltage until the current value decreases to 0.01 C to obtain a state of charge end. After a pause of 30 minutes, constant current discharge is performed with a current of 0.1 C until the battery voltage at which the potential of the positive electrode is 2.0 V (vs. Li/Li$^+$) to obtain a state of discharge end. If the battery is a battery using a metal lithium electrode as the negative electrode, the battery is made to be in a state of discharge end or a state of charge end, and then the battery may be disassembled to take out the electrode. However, in a case where the battery is a battery not using a metallic lithium electrode as the negative electrode, in order to accurately control the potential of the positive electrode, after the battery is disassembled to take out the electrode, a battery using a metallic lithium electrode as a counter electrode is assembled, and then the state is adjusted to a state of discharge end in accordance with the procedures described above.

The operation from the disassembly of a battery to the measurement is performed under an argon atmosphere at a dew point of −60° C. or less. For the positive electrode plate taken out from a battery, the electrolyte solution adhered to the electrode is thoroughly washed off by using dimethyl carbonate, the positive electrode plate is dried at room temperature for a whole day and night, and then a mixture on the aluminum foil current collector is collected. The mixture is fired at 600° C. for 4 hours by using a small-sized electric furnace to remove carbon being a conductive agent and a PVdF binder being a binder, and lithium transition metal composite oxide particles are taken out.

[Negative Active Material]

As the negative active material, it is not limited, and any negative active material may be selected as long as it is in a form capable of precipitating or absorbing lithium ions. Examples of the negative active material include a titanium-based material such as a lithium titanate having a spinel-type crystal structure and typified by Li[Li$_{1/3}$Ti$_{5/3}$]O$_4$, an alloy-base material lithium metal such as a Si, Sb, or Sn-base material, a lithium alloy (lithium metal containing alloy such as lithium-silicon, lithium-aluminum, lithium-lead, lithium-tin, lithium-aluminum-tin, lithium-gallium, or a Wood alloy), a lithium composite oxide (lithium-titanium), a silicon oxide, and further an alloy capable of absorbing and releasing lithium, and a carbon material (for example, graphite, hard carbon, low-temperature fired carbon, and amorphous carbon).

The powder of the positive active material and the powder of the negative active material preferably each have an average particle size of 100 μm or less. In particular, the powder of the positive active material preferably has an average particle size of 15 μm or less for the purpose of improving the high output power characteristics of the nonaqueous electrolyte battery. In order to obtain the powder in a predetermined shape, there are a method of preparing a precursor having a predetermined size, and a method of using a pulverizer, a classifier or the like. For example, a mortar, a ball mill, a sand mill, a vibratory ball mill, a planetary ball mill, a jet mill, a counter jet mill, a swirling flow type jet mill, a sieve, or the like is used. In the pulverization, wet pulverization in which water or an organic solvent such as hexane coexists can also be used. As the classification method, it is not limited, and a sieve, a wind classifier or the like is used as needed in both of dry and wet processes.

[Other Electrode Constituent Components]

As in the above, a positive active material and a negative active material that are main constituent components of a positive electrode and a negative electrode, respectively have been described in detail, and the positive electrode and the negative electrode each may contain a conductive agent, a binder, a thickener, a filler and the like as other constituent components in addition to the above-described main components.

The conductive agent is not limited as long as it is an electron conductive material that does not adversely affect the battery performance, and as the conductive agent, in general, a conductive material such as natural graphite (flake graphite, scaly graphite, earthy graphite or the like), artificial graphite, carbon black, acetylene black, ketjen black, carbon whisker, carbon fiber, powder of a metal (copper, nickel, aluminum, silver, gold, or the like), metal fiber, and a conductive ceramic material can be contained singly or as a mixture thereof.

Among these materials, from the viewpoint of the electron conductivity and the coatability, acetylene black is preferred as the conductive agent. The addition amount of the conductive agent is preferably 0.1% by weight to 50% by weight, and particularly preferably 0.5% by weight to 30% by weight relative to the total weight of the positive electrode or the negative electrode. In particular, when acetylene black is pulverized into ultrafine particles of 0.1 to 0.5 μm and the ultrafine particles are used, the carbon amount to be required can be reduced, and therefore this is preferred. These mix methods are for physical mixing, and the ideal mixing is uniform mixing. Therefore, by using a powder mixer such as a V-type mixer, an S-type mixer, a grinding mixer, a ball mill, or a planetary ball mill, the mixing can be performed in a dry process or a wet process.

As the binder, in general, a thermoplastic resin such as polytetrafluoroethylene (PTFE), polyvinylidene fluoride (PVDF), polyethylene, and polypropylene; and a polymer having rubber elasticity such as an ethylene-propylene-diene terpolymer (EPDM), a sulfonated EPDM, styrene-butadiene rubber (SBR), and fluorine rubber, may be used singly alone or as a mixture of two or more kinds thereof. The addition amount of the binder is preferably 1 to 50% by weight, and particularly preferably 2 to 30% by weight relative to the total weight of the positive electrode or the negative electrode.

As the filler, any filler may be used as long as it is a material that does not adversely affect the battery performance. In general, an olefin-based polymer such as polypropylene, or polyethylene, amorphous silica, alumina, zeolite, glass, carbon or the like is used. The addition amount of the filler is preferably 30% by weight or less relative to the total weight of the positive electrode or the negative electrode.

[Preparation of Positive Electrode and Negative Electrode]

The positive electrode and negative electrode are suitably prepared by kneading and mixing the above-described main constituent components (a positive active material in the positive electrode and a negative electrode material in the negative electrode) and other materials to obtain a mixture; mixing the mixture with an organic solvent such as N-methylpyrrolidone or toluene, or water; then applying or pressure-bonding the obtained mixture onto a current collector described in detail later; and performing a heating treatment at around 50° C. to 250° C. for around 2 hours. With respect to the applying method, for example, it is preferable to perform the application by using a means of roller coating with an applicator roll or the like, screen coating, a doctor blade method, spin coating, a bar coater, or the like, to obtain an arbitrary thickness and an arbitrary shape, but not limited thereto.

As the current collector, a current collector foil such as an Al foil, or a Cu foil can be used. As the current collector foil of a positive electrode, an Al foil is preferred, and as the current collector foil of a negative electrode, a Cu foil is preferred. The thickness of the current collector foil is preferably 10 to 30 µm. Further, the thickness of the mixture layer is preferably 40 to 150 µm (excluding the thickness of the current collector foil) after pressing.

[Nonaqueous Electrolyte]

The nonaqueous electrolyte to be used for the nonaqueous electrolyte secondary battery according to the present embodiment is not limited, and one that is generally proposed to be used in a lithium battery or the like can be used. Examples of the nonaqueous solvent used for a nonaqueous electrolyte include cyclic carbonic acid esters such as propylene carbonate, ethylene carbonate, butylene carbonate, chloroethylene carbonate, and vinylene carbonate; cyclic esters such as γ-butyrolactone, and γ-valerolactone; chain carbonates such as dimethyl carbonate, diethyl carbonate, and ethyl methyl carbonate; chain esters such as methyl formate, methyl acetate, and methyl butyrate; tetrahydrofuran or a derivative thereof, ethers such as 1,3-dioxane, 1,4-dioxane, 1,2-dimethoxyethane, 1,4-dibutoxyethane, and methyl diglyme; nitriles such as acetonitrile, and benzonitrile; dioxolane or a derivative thereof ethylene sulfide, sulfolane, sultone, or a derivative thereof or a single kind or a mixture of two or more kinds thereof, but the nonaqueous solvent is not limited thereto.

Examples of the electrolyte salt to be used for a nonaqueous electrolyte include an inorganic ionic salt containing one kind of lithium (Li), sodium (Na), and potassium (K), such as $LiClO_4$, $LiBF_4$, $LiAsF_6$, $LiPF_6$, LiSCN, LiBr, LiI, $Li_2SO_4$, $Li_2BoCl_{10}$, $NaClO_4$, NaI, NaSCN, NaBr, $KClO_4$, and KSCN; and an organic ionic salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearylsulfonate, lithium octylsulfonate, and lithium dodecylbenzenesulfonate, and these ionic compounds may be used alone, or in combination of two or more kinds thereof.

In addition, since the viscosity of the electrolyte can be further reduced by using a mixture of $LiPF_6$ or $LiBF_4$ with a lithium salt having a perfluoroalkyl group such as $LiN(C_2F_5SO_2)_2$, the low-temperature characteristic can be further improved, and the self discharge can be suppressed, and therefore this is more preferred.

Further, as the nonaqueous electrolyte, an ordinary temperature molten salt or an ionic liquid may be used.

In order to reliably obtain a nonaqueous electrolyte battery having high battery characteristics, the concentration of the electrolyte salt in the nonaqueous electrolyte is preferably 0.1 mol/L to 5 mol/L, and furthermore preferably 0.5 mol/L to 2.5 mol/L.

[Separator]

As the separator, it is preferable that a porous membrane, a nonwoven fabric or the like having excellent high-rate discharge performance is used alone or in combination. Examples of the material constituting a separator for a nonaqueous electrolyte battery include a polyolefin-based resin typified by polyethylene, polypropylene, or the like; a polyester-based resin typified by polyethylene terephthalate, polybutylene terephthalate, or the like; polyvinylidene fluoride; a vinylidene fluoride-hexafluoropropylene copolymer; a vinylidene fluoride-perfluorovinyl ether copolymer; a vinylidene fluoride-tetrafluoroethylene copolymer; a vinylidene fluoride-trifluoroethylene copolymer; a vinylidene fluoride-fluoroethylene copolymer; a vinylidene fluoride-hexafluoroacetone copolymer; a vinylidene fluoride-ethylene copolymer; a vinylidene fluoride-propylene copolymer; a vinylidene fluoride-trifluoropropylene copolymer; a vinylidene fluoride-tetrafluoroethylene-hexafluoropropylene copolymer; and a vinylidene fluoride-ethylene-tetrafluoroethylene copolymer.

From the viewpoint of the strength, the porosity of the separator is preferably 98% by volume or less. Further, from the viewpoint of the charge/discharge characteristics, the porosity is preferably 20% by volume or more.

In addition, as the separator, for example, a polymer gel formed of a polymer such as acrylonitrile, ethylene oxide, propylene oxide, methyl methacrylate, vinyl acetate, vinyl pyrrolidone, and polyvinylidene fluoride, and an electrolyte may be used. When the nonaqueous electrolyte is used in a gel state as described above, it is preferable in that an effect of preventing liquid leakage is exerted.

Further, for the separator, when a porous membrane, a nonwoven fabric or the like, and a polymer gel, which are described above, are used in combination, the liquid retainability of the electrolyte is improved, and therefore this is preferred. That is, when a film is formed by coating a surface and microporous wall surfaces of a polyethylene microporous membrane with a solvent-philic polymer so as to have a thickness of several µm or less, and an electrolyte is held in the micropores of the film, the solvent-philic polymer gelates.

Examples of the above-described solvent-philic polymer include polyvinylidene fluoride, and further a polymer in which an acrylate monomer, and an epoxy monomer, each having an ethylene oxide group, an ester group or the like, a monomer having an isocyanate group, and the like are crosslinked. The monomers can be subjected to a crosslinking reaction by performing electron beams (EB) irradiation, or heating or ultraviolet rays (UV) irradiation with the addition of a radical initiator.

[Configuration of Nonaqueous Electrolyte Secondary Battery]

The configuration of the nonaqueous electrolyte secondary battery according to the present embodiment is not particularly limited, and a cylindrical battery having a positive electrode, a negative electrode and a roll-shaped separator, a prismatic battery (rectangular-shaped battery), a flat battery, or the like can be mentioned as an example.

Figure 3:
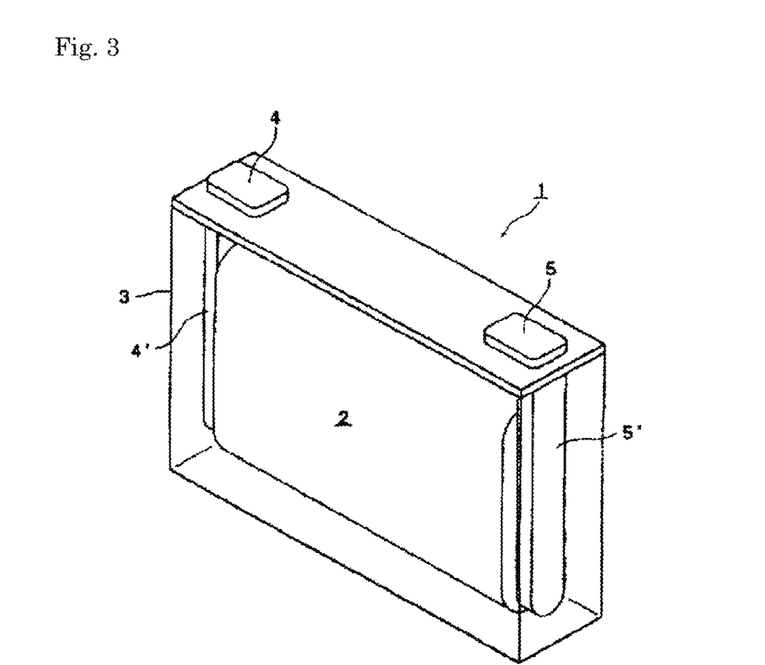
FIG. 3 is an external perspective view showing the nonaqueous electrolyte secondary battery according to one embodiment of the present invention.

FIG. 3 shows an external perspective view of a rectangular-shaped lithium secondary battery 1 that is the nonaqueous electrolyte secondary battery according to one embodiment of the present invention. Note that FIG. 3 is a perspective view showing the inside of a container. In the nonaqueous electrolyte secondary battery 1 shown in FIG. 3, an electrode group 2 is housed in a battery container 3. The electrode group 2 is formed by winding a positive electrode including a positive active material and a negative electrode including a negative active material with a separator interposed therebetween. The positive electrode is electrically connected with a positive electrode terminal 4 through a positive electrode lead 4', and the negative electrode is electrically connected with a negative electrode terminal 5 through a negative electrode lead 5'.

[Configuration of Energy Storage Apparatus]

Figure 4:
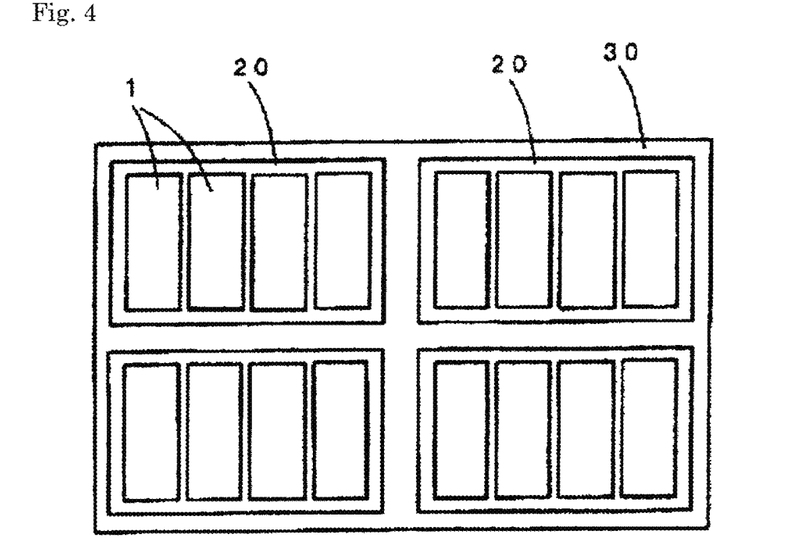
FIG. 4 is a schematic view showing an energy storage apparatus in which multiple nonaqueous electrolyte secondary batteries according to one embodiment of the present invention are assembled.

The present embodiment can be realized also as an energy storage apparatus in which multiple nonaqueous electrolyte secondary batteries described above are assembled. The energy storage apparatus according to one embodiment of the present invention is shown in FIG. 4. In FIG. 4, an energy storage apparatus 30 includes multiple energy storage units 20. Each of the energy storage units 20 includes multiple nonaqueous electrolyte secondary batteries 1. The energy storage apparatus 30 can be mounted as an automotive power supply of an electric vehicle (EV), a hybrid electric vehicle (HEV), a plug-in hybrid electric vehicle (PHEV), or the like.

EXAMPLES

Example 1

<Preparation Step of Hydroxide Precursor>

In preparation of an active material for Example, a hydroxide precursor was prepared by using a reaction crystallization method. First, 473.4 g of nickel sulfate hexahydrate, and 530.4 g of manganese sulfate pentahydrate were weighed, and the whole amount was dissolved in 4 L of ion-exchange water to prepare a 1.0 M aqueous sulfate solution in which a mole ratio of Ni:Mn was 45:55. Next, into a 5 L reaction tank, 2 L of ion-exchange water was poured, and then 1.25 mol of ammonia water and 0.4 mol of hydrazine were added in advance. Further, a $N_2$ gas was bubbled for 30 minutes to remove oxygen contained in the ion-exchange water. The temperature of the reaction tank was set to 50° C. (±2° C.), and the setting for sufficiently generating convection inside the reaction tank was performed while the contents inside the reaction tank were stirred at a rotational speed of 1500 rpm by using a paddle impeller equipped with a stirring motor. The above-described sulfate aqueous solution was added dropwise into the reaction tank at a speed of 1.3 mL/min for 50 hours. In this regard, during the time period from the start to the end of the dropwise addition, a mix alkaline solution including 4.0 M sodium hydroxide, 1.25 M ammonia, and 0.1 M hydrazine was appropriately added dropwise, so that the pH of the aqueous solution in the reaction tank was controlled to be kept at 9.8 (±0.1) at all times, and further a part of the reaction mixture was discharged by overflow so that the total amount of the reaction mixture was controlled not to exceed 2 L at all times. After completion of the dropwise addition, the stirring of the contents inside the reaction tank was continued for more one hour. The stirring was terminated, and then the resultant mixture was left to stand at room temperature for 12 hours or more.

Next, hydroxide precursor particles generated in the reaction tank were separated by using a suction filtration device, further sodium ions deposited on the particles were washed off by using ion-exchange water, and the particles were dried at 80° C. for 20 hours under normal pressure in air atmosphere by using an electric furnace. After that, the particles were pulverized with an automatic mortar made of agate for several minutes in order to make the particle sizes uniform. In this way, a hydroxide precursor was prepared.

<Firing Step>

In the hydroxide precursor in an amount of 2.262 g, 1.294 g of lithium hydroxide monohydrate was added, the resultant mixture was thoroughly mixed with an automatic mortar made of agate, and a powder mix in which a mole ratio of Li:(Ni or Mn) was 120:100 was prepared. The powder mix was made into pellets each having a diameter of 25 mm at a pressure of 6 MPa by using a pellet forming machine. The amount of the powder mix supplied to form the pellets was determined by performing conversion calculation so that the mass of the final product to be assumed was 2.5 g. One of the pellets was placed in an alumina boat having an entire length of around 100 mm, the boat was arranged in a box-type electric furnace (model number: AMF 20), the temperature was raised from ordinary temperature to 850° C. under normal pressure in the air atmosphere over 10 hours, and the pellet was fired at 850° C. for 4 hours. The box-type electric furnace had an inner dimension of 10 cm in height, 20 cm in width, and 30 cm in depth, and was provided with electric heating wires at intervals of 20 cm in the width direction. After firing, a heater was turned off, and the alumina boat was naturally allowed to cool down while being left to stand in the furnace. As a result, the temperature of the furnace was decreased to around 200° C. after the lapse of 5 hours, but the subsequent temperature drop rate was somewhat low. After the lapse of a whole day and night, the pellet was taken out after confirming that the temperature of the furnace was 100° C. or less, and the pellet was pulverized with an automatic mortar made of agate for several minutes in order to make the particle sizes uniform. In this way, a lithium transition metal composite oxide $Li_{1.09}Ni_{0.41}Mn_{0.50}O_2$ according to Example 1 was prepared.

Example 2

A lithium transition metal composite oxide according to Example 2 was prepared in the same manner as in Example 1 except that 420.6 g of nickel sulfate hexahydrate, 56.2 g of cobalt sulfate heptahydrate, and 530.4 g of manganese sulfate pentahydrate were weighed, and the whole amount was dissolved in 4 L of ion-exchange water to prepare a 1.0 M aqueous sulfate solution in which a mole ratio of Ni:Co:Mn was 40:5:55, in the preparation step of hydroxide precursor. A SEM photograph of the hydroxide precursor of Example 2 is shown in FIG. 1.

Example 3

A lithium transition metal composite oxide according to Example 3 was prepared in the same manner as in Example 1 except that 360.8 g of nickel sulfate hexahydrate, 112.4 g of cobalt sulfate heptahydrate, and 530.4 g of manganese sulfate pentahydrate were weighed, and the whole amount was dissolved in 4 L of ion-exchange water to prepare a 1.0 M aqueous sulfate solution in which a mole ratio of Ni:Co:Mn was 35:10:55, in the preparation step of hydroxide precursor.

Example 4

A lithium transition metal composite oxide according to Example 4 was prepared in the same manner as in Example 1 except that 368.0 g of nickel sulfate hexahydrate, 112.4 g of cobalt sulfate heptahydrate, and 530.4 g of manganese sulfate pentahydrate were weighed, and the whole amount was dissolved in 4 L of ion-exchange water to prepare a 1.0 M aqueous sulfate solution in which a mole ratio of Ni:Co:Mn was 30:15:55, in the preparation step of hydroxide precursor.

Example 5

A lithium transition metal composite oxide according to Example 5 was prepared in the same manner as in Example 1 except that 462.6 g of nickel sulfate hexahydrate, 56.2 g of cobalt sulfate heptahydrate, and 491.8 g of manganese sulfate pentahydrate were weighed, and the whole amount was dissolved in 4 L of ion-exchange water to prepare a 1.0 M aqueous sulfate solution in which a mole ratio of Ni:Co:Mn was 44:5:51, in the preparation step of hydroxide precursor.

Example 6

A lithium transition metal composite oxide according to Example 6 was prepared in the same manner as in Example 1 except that 378.5 g of nickel sulfate hexahydrate, 56.2 g of cobalt sulfate heptahydrate, and 569.0 g of manganese sulfate pentahydrate were weighed, and the whole amount was dissolved in 4 L of ion-exchange water to prepare a 1.0 M aqueous sulfate solution in which a mole ratio of Ni:Co:Mn was 36:5:59, in the preparation step of hydroxide precursor.

Examples 7 and 8

Lithium transition metal composite oxides according to Examples 7 and 8 were prepared in the same manner as in Example 2 except that the firing temperature was changed from 850° C. to 800° C. and 900° C., respectively in the firing step.

Example 9

A lithium transition metal composite oxide according to Example 9 was prepared in the same manner as in Example 1 except that the mole ratio of Ni:Co:Mn was set to 40:5:55, and 1.0 mol of ammonia water and 0.3 mol of hydrazine were added in advance into the reaction tank; during the time period from the start to the end of the dropwise addition of the aqueous sulfate solution, a mix alkaline solution including 4.0 M sodium hydroxide, 1.25 M ammonia, and 0.5 M hydrazine was added dropwise, so that the pH of the aqueous solution in the reaction tank was controlled to be kept at 9.5 (+0.1) at all times; and during the firing, 1.214 g of lithium hydroxide monohydrate was added in 2.315 g of the hydroxide precursor to prepare a powder mix in which a mole ratio of Li:(Ni, Co, or Mn) was 110:100, and the firing temperature was changed to 800° C., in the preparation step of hydroxide precursor.

Comparative Examples 1 to 6

Lithium transition metal composite oxides according to Comparative Examples 1 to 6 were prepared in the same manner as in Examples 1 to 6 except that the ammonia water and the hydrazine were not added in advance into the reaction tank, in the preparation step of hydroxide precursor.

Comparative Example 7

A lithium transition metal composite oxide according to Comparative Example 7 was prepared in the same manner as in Example 1 except that 262.9 g of nickel sulfate hexahydrate, 224.9 g of cobalt sulfate heptahydrate, and 530.4 g of manganese sulfate pentahydrate were weighed, and the whole amount was dissolved in 4 L of ion-exchange water to prepare a 1.0 M aqueous sulfate solution in which a mole ratio of Ni:Co:Mn was 25:20:55, in the preparation step of hydroxide precursor.

Comparative Example 8

A Lithium transition metal composite oxide according to Comparative Example 8 was prepared in the same manner as in Comparative Example 7 except that the ammonia water and the hydrazine were not added in advance into the reaction tank, in the preparation step of hydroxide precursor.

Comparative Example 9

A lithium transition metal composite oxide according to Comparative Example 9 was prepared in the same manner as in Comparative Example 7 except that the firing temperature was changed from 850° C. to 900° C. in the firing step.

Comparative Example 10

A lithium transition metal composite oxide according to Comparative Example 10 was prepared in the same manner as in Example 2 except that the firing temperature was changed from 850° C. to 700° C. in the firing step.

Comparative Example 11

Nickel sulfate hexahydrate in an amount of 315.4 g, 168.7 g of cobalt sulfate heptahydrate, and 530.4 g of manganese sulfate pentahydrate were weighed, and the whole amount was dissolved in 4 L of ion-exchange water to prepare a 1 M aqueous sulfate solution in which a mole ratio of Ni:Co:Mn was 30:15:55. On the other hand, into a 5-L reaction tank, 2 L of ion-exchange water was poured, and then 1.25 mol of ammonia water and 0.4 mol of hydrazine were added in advance. Further, a $CO_2$ gas was bubbled for 30 minutes to dissolve the $CO_2$ in the ion-exchange water. The temperature of the reaction tank was set to 50° C. (±2° C.), and the above-described sulfate aqueous solution was added dropwise at a speed of 1.3 mL/min while the contents inside the reaction tank were stirred at a rotational speed of 1500 rpm by using a paddle impeller equipped with a stirring motor. In this regard, during the time period from the start to the end of the dropwise addition, an aqueous solution containing 1 M sodium carbonate and 0.5 M ammonia was appropriately added dropwise, so that the pH of the aqueous solution in the reaction tank was controlled to be kept at 7.9 (±0.1) at all times. After completion of the dropwise addition, the stirring of the contents inside the reaction tank was continued for more 3 hours. The stirring was terminated, and then the resultant mixture was left to stand for 12 hours or more.

Next, coprecipitation carbonate particles generated in the reaction tank were separated by using a suction filtration device, further sodium ions deposited on the particles were washed off by using ion-exchange water, and the particles were dried at 80° C. for 20 hours under normal pressure in air atmosphere by using an electric furnace. After that, the particles were pulverized with an automatic mortar made of agate for several minutes in order to make the particle sizes uniform. In this way, a carbonate precursor was prepared.

A lithium transition metal composite oxide according to Comparative Example 11 was prepared in the same manner as in Example 1 except that the carbonate precursor prepared as described above was used in place of the hydroxide precursor prepared in Example 1, 0.965 g of lithium carbonate was added in 2.277 g of the carbonate precursor in the firing step to prepare a powder mix in which a mole ratio of Li:(Ni, Co or Mn) is 130:100, and the powder mix was fired.

Comparative Example 12

A lithium transition metal composite oxide according to Comparative Example 12 was prepared in the same manner as in Example 1 except that the mole ratio of Ni:Co:Mn was set to 25:10:65, and the ammonia water and the hydrazine were not added in advance into the reaction tank; and 1.159 g of lithium hydroxide monohydrate was added in 1.730 g of the hydroxide precursor in the firing step to prepare a powder mix in which a mole ratio of Li:(Ni, Co or Mn) was 140:100, and the firing temperature was changed to 900° C., in the preparation step of hydroxide precursor.

Example 10

A hydroxide precursor according to Example 10 was prepared in the same manner as in Example 4 except that the ammonia and hydrazine to be added in advance in a water solvent in the reactive layer were changed to 1.25 M ammonia and 0.1 M hydrazine, respectively, to control the pH of the aqueous solution in the reaction tank to be kept at 11 (±0.1) at all times.

Comparative Example 13

A hydroxide precursor according to Comparative Example 13 was prepared in the same manner as in Example 4 except that 0.1 M hydrazine was only added in advance without adding ammonia in a water solvent in the reactive layer to control the pH of the aqueous solution in the reaction tank to be kept at 9.5 (±0.1) at all times.

(Measurement of Tap Density of Precursor)

The tap density of each of the hydroxide precursors according to Examples 1 to 10 and Comparative Examples 1 to 10, 12, and 13 and the tap density of the carbonate precursor according to Comparative Example 11 were measured by using a tapping apparatus manufactured by REI ELECTRIC CO., LTD. in accordance with the conditions and procedures described above.

(Confirmation of α-NaFeO$_2$-Type Crystal Structure)

It was confirmed that each of the lithium transition metal composite oxides according to Examples 1 to 9 and Comparative Examples 1 to 12 had an α-NaFeO$_2$-type crystal structure from the result that the structural model and the diffraction pattern in X-ray diffraction measurement were matched.

(Measurement of Full Width at Half Maximum)

The full width at half maximum of each of the lithium transition metal composite oxides according to Examples 1 to 9 and Comparative Examples 1 to 12 was measured by using an X-ray diffractometer (model name: MiniFlex II, manufactured by Rigaku Corporation) in accordance with the conditions and procedures described above. By using "PDXL" that is supplied software of the X-ray diffractometer, in the space group R3-m, the full width at half maximum FWHM (003) for the X-ray diffraction peak that is indexed to the (003) plane and is present at $2\theta=18.6°\pm1°$ on the X-ray diffraction pattern, and the full width at half maximum FWHM (104) for the X-ray diffraction peak that is indexed to the (104) plane and is present at $2\theta=44\pm1°$ on the X-ray diffraction pattern were determined. From the measurement results, the ratio FWHM (003)/FWHM (104) was determined.

[Preparation of Electrode for Nonaqueous Electrolyte Secondary Battery]

By using the lithium transition metal composite oxides according to Examples 1 to 9 and Comparative Examples 1 to 12 as the positive active materials, respectively, the electrodes for nonaqueous electrolyte secondary batteries according to Examples 1 to 9 and Comparative Examples 1 to 12 were prepared in accordance with the following procedures.

A paste for coating in which N-methylpyrrolidone was used as a dispersion medium, and an active material, an acetylene black (AB), and polyvinylidene fluoride (PVdF) were kneaded and mixed at a mass ratio of 90:5:5 and dispersed was prepared. The paste for coating was applied on one surface of an aluminum foil current collector having a thickness of 20 m to prepare a positive electrode plate. In this regard, the coating thickness of the active material applied per certain area was unified so that test conditions for determining a discharge capacity per unit volume were identical to each other among the lithium secondary batteries according to all of Examples and Comparative Examples. In the thus prepared electrode for nonaqueous electrolyte secondary battery, a part of the electrode was cut out, and a test battery that is a nonaqueous electrolyte secondary battery (lithium secondary battery) was prepared in accordance with the following procedures, and the battery characteristics were evaluated.

[Preparation and Evaluation of Nonaqueous Electrolyte Secondary Battery]

For the purpose of accurately observing the independent behavior of a positive electrode, metallic lithium was brought into close contact with a nickel foil current collector and used for a counter electrode, that is, a negative electrode. In this regard, a sufficient amount of metallic lithium was arranged on the negative electrode so that the capacity of the lithium secondary battery was not limited by the negative electrode.

As the electrolyte solution, a solution obtained by dissolving LiPF$_6$ in a mixed solvent of ethylene carbonate (EC)/ethyl methyl carbonate (EMC)/dimethyl carbonate (DMC) with a volume ratio of 6:7:7 so as to have a concentration of LiPF$_6$ of 1 mol/L was used. As the separator, a microporous membrane made of polypropylene, the surface of which was modified with polyacrylate, was used. As the outer case, a metal resin composite film including a polyethylene terephthalate (15 μm)/aluminum foil (50 μm)/metal-adhesive polypropylene film (50 Mm) was used. The electrodes were housed such that the open ends of the positive electrode terminal and the negative electrode terminal were externally exposed, fusion bonding margins of the inner surfaces of the above-described metal resin composite films, which face each other, were airtightly sealed except for a part to be a liquid injection hole, and the above-described electrolyte solution was injected, and then the liquid injection hole was sealed.

The lithium secondary battery prepared in the procedures described above was subjected to an initial charge-discharge step at 25° C. The charge was set as constant current constant voltage charge with a current of 0.1 C and a voltage of 4.6 V, and the charge termination condition was set at the time point when the current value attenuated to ⅙. The discharge was set as constant current discharge with a current of 0.1 C and a final voltage of 2.0 V This charge-discharge was performed 2 cycles. In this regard, a pause period of 30 minutes was provided each after charge and after discharge.

Next, a charge-discharge test of one cycle was performed. The charge was set as constant current constant voltage charge with a current of 0.1 C and a voltage of 4.45 V and the charge termination condition was set at the time point when the current value attenuated to ⅙. The discharge was set as constant current discharge with a current of 0.1 C and a final voltage of 2.0 V. In this regard, a pause period of 10 minutes was provided each after charge and after discharge. The discharge capacity (mAh/g) of the positive active material in this cycle was recorded.

(Measurement of Limit Mixture Density)

Each of the electrodes for nonaqueous electrolyte secondary batteries according to Examples 1 to 9 and Comparative Examples 1 to 12, which had been prepared in the above, was cut out into multiple sheets each having a size of 2 cm×2 cm, and various pressed electrodes each having different electrode plate thickness were prepared by applying various pressing pressures from 1 MPa to 15 MPa with the use of a flat plate press machine (CDM-20M TYPE P-1B, manufactured by RIKEN SEIKI Co., LTD.). The mixture density (g/cm$^3$) was calculated from the thickness and weight of each of the pressed electrodes.

Each of the pressed electrodes was dried under reduced pressure for 12 hours under a temperature environment of 120° C. to sufficiently remove moisture content, and then was folded in half by hand without having anything in the valley part with the line connecting the middle points of two opposite sides of a square of 2 cm×2 cm as a fold, and the other two opposite sides were matched with each other. Further, the crest part of the fold being curved and U-shaped was pressed, and the surfaces of the electrodes were brought into contact with each other over the entire surface. Next, the folded pressed electrode was unfolded back to the original planar state, the folded part was visually observed by directing the electrode toward a visible light source, and the presence or absence of breakage in the part of the mixture layer was confirmed by whether or not visible light was observed through the folded part. Subsequently, among the electrodes in which any breakage had not been observed, an electrode having the thinnest thickness was determined, and the mixture density (g/cm$^3$) according to the electrode was defined as a "limit mixture density (g/cm$^3$)" of the electrode for nonaqueous electrolyte secondary battery according to each of Examples or Comparative Examples.

For each of Examples and Comparative Examples, the "0.1 C capacity (mAh/cm$^3$)" being a discharge capacity per unit volume was calculated by multiplying the value of the discharge capacity (mAh/g) by the value of each limit mixture density (g/cm$^3$).

(Measurement of Peak Differential Pore Volume)

In measurement of the peak differential pore volume of the lithium transition metal composite oxide particles according to each of Examples 1 to 9 and Comparative Examples 1 to 12, the above-described test battery in a discharge state was disassembled to take out a positive electrode plate, and for the particles of the lithium transition metal composite oxide that is an active material in the positive electrode plate collected in accordance with the above-described procedures, the peak differential pore volume was measured by using "autosorb iQ" and control/analysis software "ASiQwin", which are manufactured by Quantachrome Instruments.

For each of the lithium transition metal composite oxides according to Examples 1 to 9 and Comparative Examples 1 to 12, the ratio Li/Me, the ratio Ni/Me, the ratio Co/Me, the ratio Mn/Me, the kind of the coprecipitation precursor of the transition metal element, the firing temperature, the ratio FWHM (003)/FWHM (104), the peak differential pore volume, the 0.1 C capacity of the lithium secondary battery obtained using each of the lithium transition metal composite oxides as a positive active material, the tap density of the precursor, and the presence or absence of the ammonia and hydrazine that are dissolved in advance in a water solvent in a reaction tank (in Table 1, expressed as "addition in advance"), are shown in Table 1. For each of the precursors according to Example 10 and Comparative Example 13, the ratio Ni/Me, the ratio Co/Me, the ratio Mn/Me, the kind of the precursor, the pH of the reaction tank, the concentration of the ammonia to be added in advance, the concentration of the hydrazine to be added in advance, and the tap density of the precursor are shown in Table 2.

TABLE 1

| | Ratio Li/Me | Ratio Ni/Me | Ratio Co/Me | Ratio Mn/Me | Kind of precursor | Firing temperature [° C.] | FWHM (003)/ FWHM (104) | Peak differential pore volume [mm$^3$/(g · nm)] | 0.1C capacity [mAh/cm$^3$] | Tap density of precursor [g/cm$^3$] | Addition in advance |
|---|---|---|---|---|---|---|---|---|---|---|---|
| Example 1 | 1.2 | 0.45 | 0.00 | 0.55 | Hydroxide | 850 | 0.62 | 0.42 | 610 | 1.2 | Presence |
| Example 2 | 1.2 | 0.40 | 0.05 | 0.55 | Hydroxide | 850 | 0.65 | 0.37 | 612 | 1.2 | Presence |
| Example 3 | 1.2 | 0.35 | 0.10 | 0.55 | Hydroxide | 850 | 0.66 | 0.32 | 613 | 1.4 | Presence |
| Example 4 | 1.2 | 0.30 | 0.15 | 0.55 | Hydroxide | 850 | 0.67 | 0.30 | 611 | 1.5 | Presence |
| Example 5 | 1.2 | 0.44 | 0.05 | 0.51 | Hydroxide | 850 | 0.65 | 0.35 | 604 | 1.2 | Presence |
| Example 6 | 1.2 | 0.36 | 0.05 | 0.59 | Hydroxide | 850 | 0.59 | 0.47 | 606 | 1.2 | Presence |
| Example 7 | 1.2 | 0.40 | 0.05 | 0.55 | Hydroxide | 800 | 0.56 | 0.50 | 607 | 1.2 | Presence |
| Example 8 | 1.2 | 0.40 | 0.05 | 0.55 | Hydroxide | 900 | 0.72 | 0.20 | 610 | 1.2 | Presence |
| Example 9 | 1.1 | 0.40 | 0.05 | 0.55 | Hydroxide | 800 | 0.55 | 0.21 | 561 | 1.5 | Presence |
| Comparative Example 1 | 1.2 | 0.45 | 0.00 | 0.55 | Hydroxide | 850 | 0.62 | 0.88 | 480 | 0.7 | Absence |
| Comparative Example 2 | 1.2 | 0.40 | 0.05 | 0.55 | Hydroxide | 850 | 0.65 | 0.85 | 482 | 0.7 | Absence |
| Comparative Example 3 | 1.2 | 0.35 | 0.10 | 0.55 | Hydroxide | 850 | 0.66 | 0.79 | 485 | 0.7 | Absence |
| Comparative Example 4 | 1.2 | 0.30 | 0.15 | 0.55 | Hydroxide | 850 | 0.67 | 0.75 | 483 | 0.7 | Absence |
| Comparative Example 5 | 1.2 | 0.44 | 0.05 | 0.51 | Hydroxide | 850 | 0.65 | 0.84 | 472 | 0.7 | Absence |
| Comparative Example 6 | 1.2 | 0.36 | 0.05 | 0.59 | Hydroxide | 850 | 0.59 | 0.92 | 475 | 0.7 | Absence |
| Comparative Example 7 | 1.2 | 0.25 | 0.20 | 0.55 | Hydroxide | 850 | 0.68 | 0.56 | 511 | 0.7 | Presence |
| Comparative Example 8 | 1.2 | 0.25 | 0.20 | 0.55 | Hydroxide | 850 | 0.68 | 0.58 | 508 | 0.7 | Absence |
| Comparative Example 9 | 1.2 | 0.25 | 0.20 | 0.55 | Hydroxide | 900 | 0.72 | 0.47 | 482 | 0.7 | Presence |
| Comparative Example 10 | 1.2 | 0.40 | 0.05 | 0.55 | Hydroxide | 700 | 0.65 | 0.65 | 505 | 1.2 | Presence |

TABLE 1-continued

| | Ratio Li/Me | Ratio Ni/Me | Ratio Co/Me | Ratio Mn/Me | Kind of precursor | Firing temperature [° C.] | FWHM (003)/ FWHM (104) | Peak differential pore volume [mm³/(g·nm)] | 0.1C capacity [mAh/cm³] | Tap density of precursor [g/cm³] | Addition in advance |
|---|---|---|---|---|---|---|---|---|---|---|---|
| Comparative Example 11 | 1.3 | 0.30 | 0.15 | 0.55 | Carbonate | 850 | 0.67 | 0.88 | 496 | 1.3 | Presence |
| Comparative Example 12 | 1.4 | 0.25 | 0.10 | 0.65 | Hydroxide | 900 | 0.77 | 0.30 | 504 | 0.7 | Absence |

TABLE 2

| | Ratio Ni/Me | Ratio Co/Me | Ratio Mn/Me | Kind of precursor | pH of reaction tank | Ammonia/M added in advance | Hydrazine/M added in advance | Tap density of precursor [g/cm³] |
|---|---|---|---|---|---|---|---|---|
| Example 10 | 0.30 | 0.15 | 0.55 | Hydroxide | 11.0 | 1.25 | 0.1 | 1.5 |
| Comparative Example 13 | 0.30 | 0.15 | 0.55 | Hydroxide | 9.5 | 0 | 0.1 | 0.8 |

From Table 1, it can be understood that the lithium secondary batteries using the lithium transition metal composite oxides according to Examples 1 to 9, each of which has a crystal structure with a ratio FWHM (003)/FWHM (104) of 0.72 or less and has a peak differential pore volume of 0.50 mm³/(g·nm) or less, have a large 0.1 C capacity per unit volume.

The crystal structure and microstructure described above were obtained in a case where the lithium transition metal composite oxide had a composition in which the ratio Li/Me was larger than 1 and smaller than 1.4, the ratio Mn/Me was larger than 0.5, and the ratio Co/Me was 0.15 or less, the coprecipitation precursor was a hydroxide, the ammonia and hydrazine were added in advance in the reaction tank at the time of preparing the hydroxide precursor, and the firing was performed at a temperature of 800 to 900° C. When the above-described addition in advance was performed, the tap density of the hydroxide precursor became 1.2 g/cm³ or more.

As shown in Example 10 of Table 2, when the ammonia and hydrazine were added in advance in the reaction tank at the time of preparing the hydroxide precursor, even in a case where the pH of the inside of the reaction tank was increased to 11, the tap density of the hydroxide precursor became 1.2 g/cm³ or more. As shown in Comparative Example 13, in a case where the hydrazine was only added in advance without adding the ammonia in advance, the tap density of the hydroxide precursor was not improved.

As in the cases of the lithium transition metal composite oxides according to Comparative Examples 1 to 6, in a case where the ammonia and hydrazine were not added in advance in the reaction tank at the time of preparing the hydroxide precursor, the tap density of the hydroxide precursor was as low as 0.7 g/cm³. Further, each of the lithium transition metal composite oxides obtained by firing these hydroxide precursors has a ratio FWHM (003)/FWHM (104) of 0.72 or less, a peak differential pore volume of larger than 0.50 mm³/(g·nm), and a small 0.1 C capacity per unit volume.

As in the cases of the lithium transition metal composite oxides according to Comparative Examples 7 and 8, in a case where the ratio Co/Me was 0.2 (larger than 0.15), the tap density was as low as 0.7 g/cm³, and never reached 1.2 g/cm³ or more regardless of the presence or absence of the ammonia and hydrazine added in advance in the reaction tank. In a case where these hydroxide precursors were fired at 850° C., the lithium transition metal composite oxide had a ratio FWHM (003)/FWHM (104) of 0.72 or less, a peak differential pore volume of larger than 0.50 mm³/(g·nm), and a small 0.1 C capacity per unit volume.

In a case where a hydroxide precursor having a ratio Co/Me of 0.2, which had been prepared by adding ammonia and hydrazine in advance in a reaction tank, was fired at 900° C. (Comparative Example 9), the lithium transition metal composite oxide had a ratio FWHM (003)/FWHM (104) of 0.72 or less, a peak differential pore volume of 0.50 mm³/(g·nm) or less, and a small 0.1 C capacity per unit volume.

In a case where a hydroxide precursor having a ratio Mn/Me of larger than 0.5 and a ratio Co/Me of 0.15 or less, which had been prepared by adding ammonia and hydrazine in advance in a reaction tank, was fired at 700° C. (Comparative Example 10), the obtained lithium transition metal composite oxide had a ratio FWHM (003)/FWHM (104) of 0.72 or less, a peak differential pore volume of larger than 0.50 mm³/(g·nm), and a small 0.1 C capacity per unit volume.

As in the case of Comparative Example 11, when a carbonate precursor was employed as a coprecipitation precursor, even in a case where the ammonia and hydrazine were added in advance in a reaction tank at the time of preparing the coprecipitation precursor, the lithium transition metal composite oxide had a peak differential pore volume of larger than 0.50 mm³/(g·nm), and a small 0.1 C capacity per unit volume.

In a case where a hydroxide precursor having a ratio Mn/Me of larger than 0.5 and a ratio Co/Me of 0.15 or less, which had been prepared by adding ammonia and hydrazine in advance in a reaction tank, was employed, the lithium transition metal composite oxide had a peak differential pore volume of 0.50 mm³/(g·nm) or less, a ratio FWHM (003)/FWHM (104) of larger than 0.72, and a small 0.1 C capacity per unit volume, when the ratio Li/Me was 1.4 (Comparative Example 12).

As described above, it can be said that by using the lithium transition metal composite oxide satisfying all of the requirements that the ratio Li/Me is larger than 1, the ratio Mn/Me is larger than 0.5, the ratio Co/Me is 0.15 or less, the ratio FWHM (003)/FWHM (104) is 0.72 or less, and the peak differential pore volume is 0.50 mm³/(g·nm) or less, as a positive active material of the nonaqueous electrolyte secondary battery, the discharge capacity per unit volume becomes large.

That is, such a lithium transition metal composite oxide is obtained in a case where a complexing agent (ammonia water) and a reducing agent (hydrazine) were added in advance in a reaction tank at the time of preparing the hydroxide precursor, and the firing was performed at a temperature of 800 to 940° C.

INDUSTRIAL APPLICABILITY

Since a nonaqueous electrolyte secondary battery having a large discharge capacity per unit volume can be provided by using a positive active material containing the lithium transition metal composite oxide according to one aspect of the present invention, the nonaqueous electrolyte secondary battery is useful as a nonaqueous electrolyte secondary battery for a hybrid electric vehicle and an electric vehicle.

DESCRIPTION OF REFERENCE SIGNS

1: Nonaqueous electrolyte secondary battery (lithium secondary battery)
2: Electrode group
3: Battery container
4: Positive electrode terminal
4': Positive electrode lead
5: Negative electrode terminal
5': Negative electrode lead
20: Energy storage unit
30: Energy storage apparatus

The invention claimed is:

1. A lithium transition metal composite oxide, comprising an α-NaFeO$_2$-type crystal structure, wherein
a mole ratio (Li/Me) of Li to a transition metal (Me) is larger than 1, the Li and the transition metal (Me) form the lithium transition metal composite oxide,
the transition metal (Me) includes Mn and Ni, or Mn, Ni and Co, a mole ratio Mn/Me of the Mn to the transition metal (Me) is larger than 0.5, a mole ratio Ni/Me of the Ni to the transition metal (Me) is 0.3 or more and less than 0.5, and a mole ratio Co/Me of the Co to the transition metal (Me) is 0.15 or less,
the lithium transition metal composite oxide has an X-ray diffraction pattern attributable to R3-m, and a ratio (FWHM (003)/FWHM (104)) of a full width at half maximum of a diffraction peak of a (003) plane to a full width at half maximum of a diffraction peak of a (104) plane in a Miller index hkl in X-ray diffraction measurement using a CuKα ray is 0.72 or less,
or the lithium transition metal composite oxide has an X-ray diffraction pattern attributable to P3$_1$12, and a ratio (FWHM (003)/FWHM (114)) of a full width at half maximum of a diffraction peak of a (003) plane to a full width at half maximum of a diffraction peak of a (114) plane in a Miller index hkl in X-ray diffraction measurement using a CuKα ray is 0.72 or less, and
particles of the lithium transition metal composite oxide have a peak differential pore volume of 0.50 mm$^3$/(g·nm) or less as determined by a BJH method from an adsorption isotherm using a nitrogen gas adsorption method.

2. The lithium transition metal composite oxide according to claim 1, wherein
a mole ratio (Li/Me) of the Li to the transition metal (Me) is less than 1.4.

3. The lithium transition metal composite oxide according to claim 1, wherein
a mole ratio Co/Me of the Co to the transition metal (Me) is less than 0.1.

4. A positive active material for a nonaqueous electrolyte secondary battery, comprising the lithium transition metal composite oxide according to claim 1.

5. An electrode for nonaqueous electrolyte secondary battery, comprising the positive active material according to claim 4.

6. A nonaqueous electrolyte secondary battery, comprising the electrode for nonaqueous electrolyte secondary battery according to claim 5.

7. An energy storage apparatus, comprising a plurality of the nonaqueous electrolyte secondary batteries according to claim 6.

* * * * *